United States Patent [19]

McCarthy et al.

[11] 4,172,352
[45] Oct. 30, 1979

[54] APPARATUS FOR HARVESTING FRUIT

[76] Inventors: Leland J. McCarthy, 1736 W. Alluvial, Fresno, Calif. 93711; Vernal A. Amaro, 5521 22nd Ave., Riverdale, Calif. 93656; Warren Belvail, 1270 Cypress La., Lemoore, Calif. 93245

[21] Appl. No.: 754,492

[22] Filed: Dec. 27, 1976

[51] Int. Cl.² .................................... A01D 46/00
[52] U.S. Cl. .................... 56/328 TS; 56/DIG. 15
[58] Field of Search ............... 56/330, 331, 328 R, 56/328 TS, 27.5, 13.9, 10.2, DIG. 15; 214/83.1

[56] References Cited

U.S. PATENT DOCUMENTS

| | | | |
|---|---|---|---|
| 2,571,865 | 10/1951 | Greedy et al. | 56/64 |
| 2,714,281 | 8/1955 | Steele | 56/329 |
| 2,929,184 | 3/1960 | Lamouria | 56/1 |
| 3,126,692 | 3/1964 | Weygandt et al. | 56/330 |
| 3,187,493 | 6/1965 | Harrett | 56/330 |
| 3,203,159 | 8/1965 | Weygandt et al. | 56/1 |
| 3,245,211 | 4/1966 | Weygandt et al. | 56/330 |
| 3,305,113 | 2/1967 | Gardner | 214/83.1 |
| 3,360,913 | 1/1968 | Burton | 56/330 |
| 3,439,482 | 4/1969 | Orton | 56/330 |
| 3,584,446 | 6/1971 | Bernshausen | 56/328 TS |
| 3,601,965 | 8/1971 | Kaessbohrer et al. | 56/330 |
| 3,636,688 | 1/1972 | Fontan et al. | 56/330 |
| 3,683,547 | 8/1972 | Harden | 56/DIG. 15 X |
| 3,727,332 | 4/1973 | Zimmer | 56/DIG. 15 X |
| 3,827,503 | 8/1974 | Hansen | 56/327 X |
| 3,830,048 | 8/1974 | Ervin | 56/331 |
| 3,848,399 | 11/1974 | Makeham | 56/13.9 |
| 3,890,774 | 6/1975 | Bruel | 56/330 |
| 3,921,374 | 11/1975 | Mizzi | 56/10.2 |

FOREIGN PATENT DOCUMENTS 2298928 of 1975 France ........................................ 56/330

OTHER PUBLICATIONS

Upright Update, vol. 1, No. 2, 1975, Upright Harvesters, 1775 Park St., Selma, Cal. 93662.

Primary Examiner—Louis G. Mancene
Assistant Examiner—Mickey Yu
Attorney, Agent, or Firm—Huebner & Worrel

[57] ABSTRACT

An apparatus having a frame with a work station therein and adapted for movement relative to a work object having elongated overhanging portions, a pair of rearwardly inclined elongated members mounted for rotational movement on the frame in spaced relation defining a path of travel for the work object therebetween and into the work station of the frame, and a drive mechanism adapted to rotate the members to carry the overhanging portions of the work object over the members to raise the portions along the inclined members to elevated positions during passage of the work object through the work station for the performance of a work operation in the work station.

4 Claims, 25 Drawing Figures

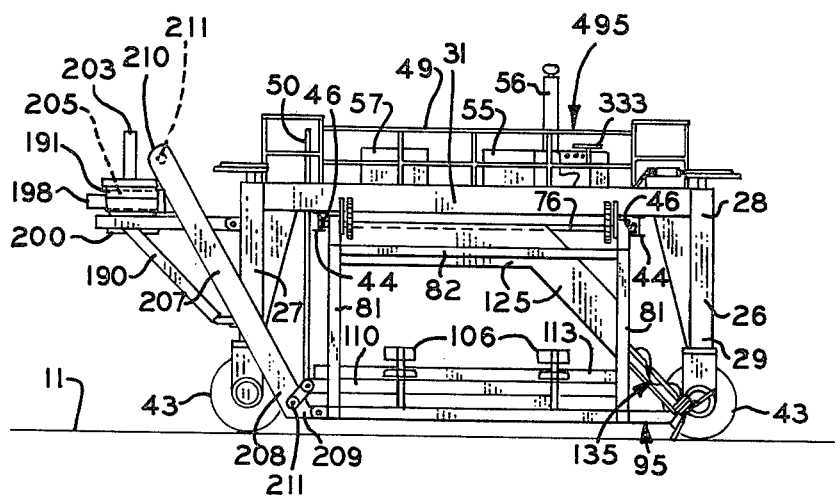
Fig. 3
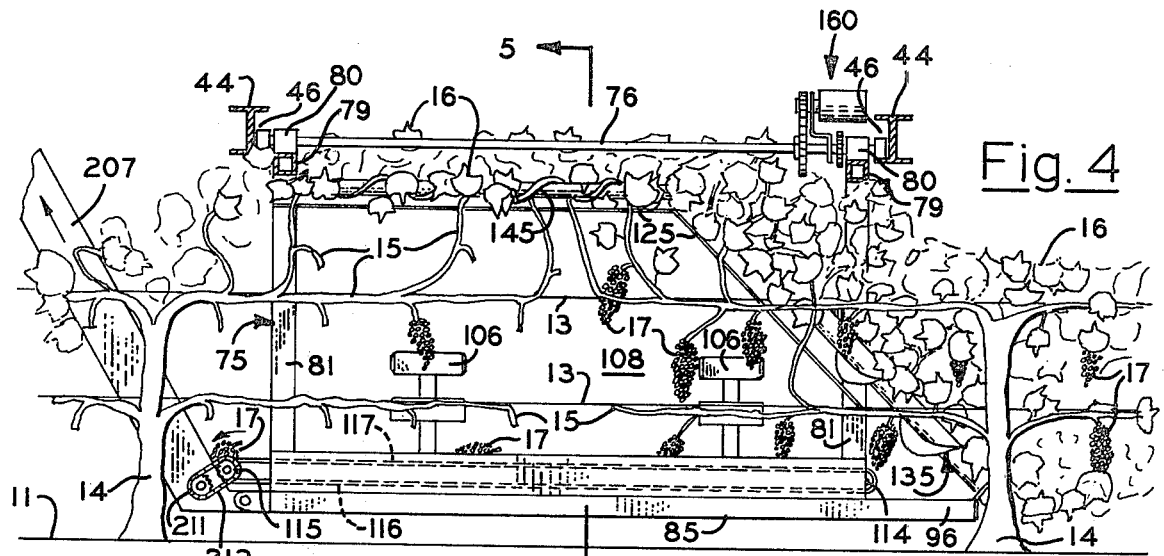
Fig. 4
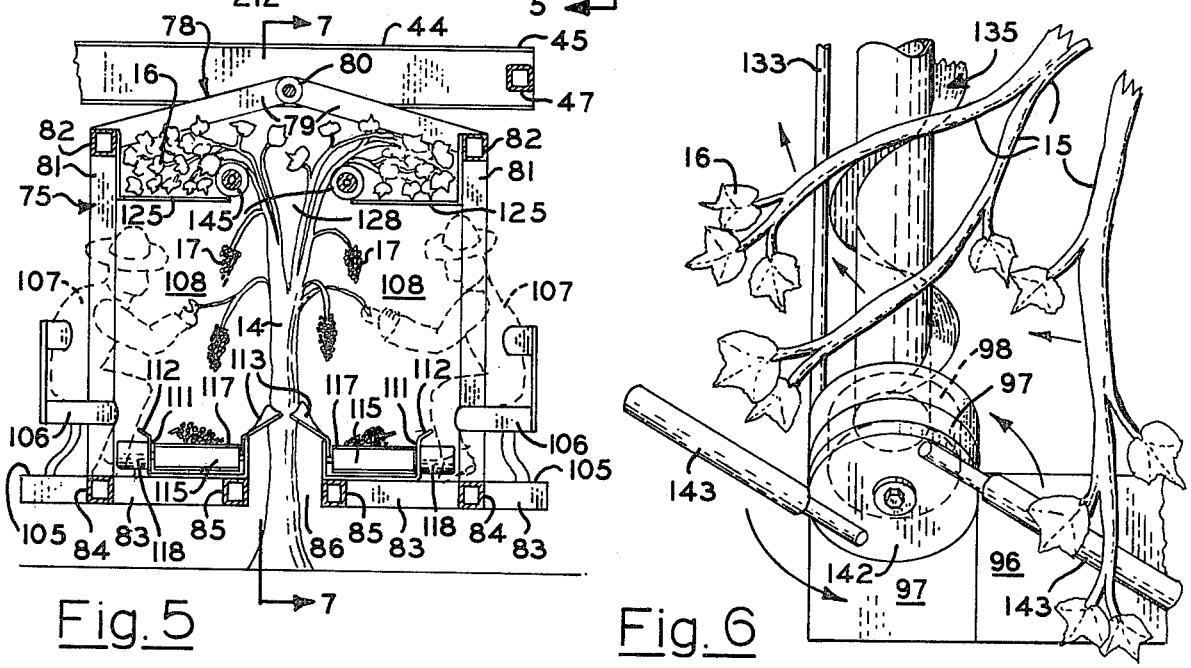
Fig. 5
Fig. 6

APPARATUS FOR HARVESTING FRUIT

BACKGROUND OF THE INVENTION

1. Field of the Invention

The present invention relates to an apparatus for harvesting fruit and performing other operations on work objects having overhanging portions which interfere with the operation to be performed and more particularly to such an apparatus which is particularly well suited to the harvesting of grapes in a mass operation on a semi-automatic or fully automatic basis and which exposes the grapes for harvesting during passage through a work station while substantially precluding damage to the grapevines and to the harvested grapes.

2. Description of the Prior Art

The prior art with respect to mechanical harvesting equipment is typified by the devices disclosed by the following patents:

| | | | |
|---|---|---|---|
| 1,780,820 | Hahn | Nov. | 4, 1930 |
| 2,516,473 | McLendon | July | 25, 1950 |
| 2,571,865 | Greedy et al. | Oct. | 16, 1951 |
| 2,893,194 | Lamouria | July | 7, 1959 |
| 2,929,184 | Lamouria | March | 22, 1960 |
| 3,328,944 | Shepardson | July | 4, 1967 |
| 3,766,724 | Paillou | Oct. | 23, 1973 |
| 3,783,595 | Tolochko et al. | Jan. | 8, 1974 |
| 3,830,048 | Ervin | Aug. | 20, 1974 |
| 3,848,399 | Makeham | Nov. | 19, 1974 |

The harvesting of fruit and particularly of grapes and the performance of other work operations on grapevines and other work objects present many impediments to mechanization. With respect to the harvesting of grapes, one of the primary obstacles is that the overhanging vine structures, or canes, and foliage of the grapevines tend to envelope the grape bunches and to isolate them from the exterior of the grapevine making the bunches difficult to reach for harvesting. Furthermore, the canes and foliage easily become entangled in mechanical equipment resulting in breakdown of the equipment and damage to the vines. Attempts have been made to train the grapevines so as to cause the canes to grow along trellises and to suspend the grape bunches beneath the trellises for purposes of mechanical harvesting. Insofar as the Applicants are aware, all such attempts have proved unsatisfactory.

The mechanical devices which have been developed for the harvesting of grapes are typified by the following patents:

| | | | |
|---|---|---|---|
| 3,490,217 | Olmo et al. | Jan. | 20, 1970 |
| 3,492,801 | Olmo et al. | Feb. | 3, 1970 |
| 3,601,964 | Fisher et al. | Aug. | 31, 1971 |
| 3,601,965 | Kaessbohrer et al. | Aug. | 31, 1971 |
| 3,667,201 | Claxton et al. | June | 6, 1972 |

Such devices are characterized by the use of various contrivances which are operated to beat or strike the vines to harvest the grapes. These devices are capable of harvesting grapes, but the harvested grapes are damaged to such a degree that they are only acceptable for use in the making of wine. In many instances, even wineries refuse to accept the grapes so harvested because of the inferior quality wine resulting from grapes so harvested and their accompanying vines, leaves and other debris. Furthermore, such devices frequently damage the grapevines to such an extent that the results are unsatisfactory.

The particular difficulties inherent in the mechanization of grape harvesting and the performance of other work operations on grapevines have perpetuated the nearly total dependency of the industry on manual labor. Yet the advancing cost of such manual labor and the other problems attendant to the use of such work forces have made their use progressively impractical.

Therefore, it has long been recognized that it would be desirable to have an apparatus which is capable of performing work operations on grapevines and other such work objects which have overhanging portions which otherwise interfere with the work operation; which is particularly well suited to the mechanical harvesting of grapes on a semi-automatic or fully automatic basis; which is capable of harvesting grapes on a massive scale while reducing to an absolute minimum the damage to the vines and grapes; and which operates cleanly, efficiently and with a minimum labor force to achieve a fully reliable and economically feasible result.

SUMMARY OF THE INVENTION

Therefore, it is an object of the present invention to provide an improved apparatus for harvesting fruit and performing other work operations.

Another object is to provide such an apparatus which is adapted for use on work objects having portions which extend about the work objects and which is operable to raise the portions to elevated positions during passage relative thereto for the performance of the work operation.

Another object is to provide such an apparatus which is particularly well suited to the harvesting of grapes and which operates to reposition the vine structures, canes and foliage enclosing grapes to be harvested so as to expose the grapes for the harvesting operation.

Another object is to provide such an apparatus which in a first embodiment is adapted semi-automatically to harvest grapes by transporting field workers thereon to harvest the grapes exposed by the apparatus as it is propelled along rows of grapevines.

Another object is to provide such an apparatus which in a second embodiment is adapted to reciprocate or shake the grapevines during movement of the apparatus along a row of grapevines to dislodge the individual grapes from the grape bunches subsequent to exposure of the grape bunches for harvesting by the apparatus.

Another object is to provide such an apparatus which can be operated to apply the minimum amount of reciprocating action to the grapevines necessary to dislodge the individual grapes for the particular variety to be harvested so as to minimize damage to the grapes and vines.

Another object is to provide such an apparatus which can be operated discriminately to harvest only those grapes which are usable while leaving unusable grapes and foliage on the grapevines.

Another object is to provide such an apparatus which is adapted to harvest a plurality of rows of grapevines simultaneously and to deliver the harvested grapes to a common receptacle.

Another object is to provide such an apparatus which is operable automatically to readjust itself for precise alignment with rows of grapevines where a variation in alignment occurs.

Another object is to provide such an apparatus which mounts a plurality of subframes for individual alignment with rows of grapevines and has the capability of automatically, individually repositioning those subframes for precise individual alignment with their respective rows upon the initiation of misalignment between the subframe and its respective row.

Another object is to provide such an apparatus which permits the harvesting of grapes with an ease and efficiency not heretofore achieved.

Another object is to provide such an apparatus which reduces to a minimum the quantity of extraneous material collected with the harvested grapes.

Another object is to provide such an apparatus which in one embodiment isolates a substantial portion of the foliage of the vine from the bunches of grapes so as to avoid intermixing of foliage and other extraneous material with the grapes and which operates automatically to separate the individual grapes from their stems so as to collect substantially only the individual grapes.

A further object is to provide such an apparatus which can be employed in the harvesting of grapes of virtually all varieties and for use in wine making, drying into raisins and as table grapes.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 3 is a side elevation of the apparatus.

FIG. 4 is a somewhat enlarged fragmentary longitudinal vertical section taken on line 4—4 in FIG. 2.

FIG. 5 is a fragmentary transverse vertical section taken from a position indicated by line 5—5 in FIG. 4.

FIG. 6 is a somewhat enlarged fragmentary front elevation of an auger assembly forming an operable part of the apparatus.

DESCRIPTION OF THE FIRST EMBODIMENT

The apparatus of the present invention can take a wide variety of specific embodiments without departing from the scope of the invention. While the two embodiments disclosed herein are the preferred embodiments, the specific operational conditions involved may make another embodiment preferred for those particular conditions.

Figures 1, 2:
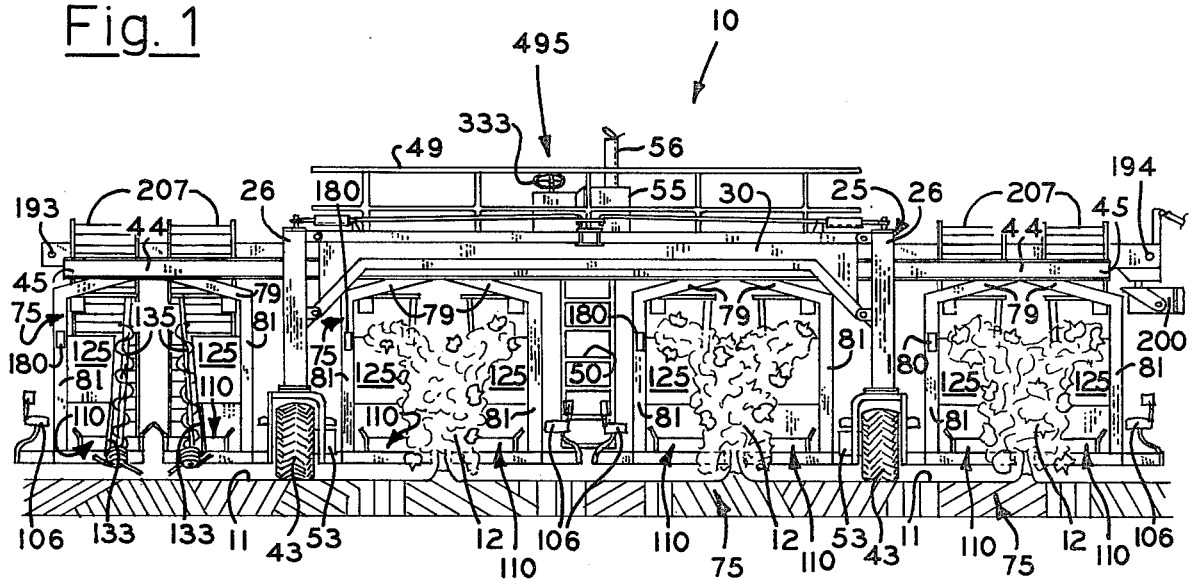
FIG. 1 is a front elevation of the apparatus of the first form of the present invention shown in a representative operative environment.
FIG. 2 is a top plan view of the apparatus of FIG. 1.

Referring more particularly to the drawings, FIG. 1 shows the apparatus of the first form of the present invention generally indicated at 10. The apparatus 10 is shown in FIG. 1 in a representative operational environment where the earth surface is indicated at 11. The apparatus is shown in position on three rows of grapevines 12. The apparatus 10 is adapted in the described embodiments to harvest grapes from four rows of grapevines simultaneously. The apparatus is shown in FIGS. 1 and 2 harvesting grapes from three rows of grapevines simply for illustrative convenience in showing the operative elements of one of the harvesting units hereinafter to be described.

As shown in FIG. 4, each of the rows of grapevines is trained, in the conventional fashion, to grow in supported relation on trellis wires 13. The wires are themselves supported by grape stakes or other suitable supports, not shown. Each row is composed of a plurality of grapvines 14. Each grapevine has a plurality of elongated vine structures, elements or canes 15 and foliage 16 thereon. Many of the canes of each vine and much of the foliage extend downwardly from the trellis wires about the vine. Thus, the grape bunches 17 growing on the vines tend to be enveloped by the canes and foliage and isolated from the exterior thereof. It is this growth pattern which has interfered with the operation of prior art grape harvesting devices.

The apparatus 10 has a main frame 25. The main frame has a pair of front corner posts 26 and a pair of rear corner posts 27. Each of the corner posts 26 and 27 individually have an upper end 28 and a lower end 29. The front corner posts of the pair and the rear corner posts of the pair are respectively interconnected by transverse frame members 30. Each front corner post is interconnected with its corresponding rear corner post on the same side of the apparatus by a longitudinal frame member 31. The frame members 30 and 31 interconnect the corner posts to form a rigid, substantially rectangular main frame wherein the corner posts are positioned at the corners of the rectangle and are disposed in upright, substantially parallel attitudes.

Figure 12:
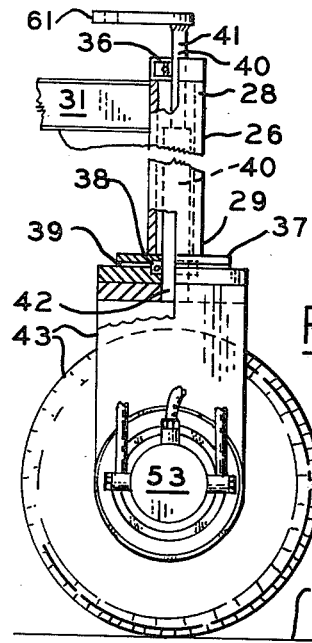
FIG. 12 is a somewhat enlarged, fragmentary side elevation of a wheel assembly of the apparatus with portions broken away to disclose its internal structure.

As can best be seen in FIG. 12, each of the corner posts 26 and 27 has a first bearing 36 mounted on the upper end 28 and a pressure plate 37 secured on the lower end 29. A second bearing 38 is mounted on the pressure plate in axial alignment with the first bearing. A teflon pad 39 is affixed on the pressure plate about the second bearing. A steering shaft 40 is borne by the first and second bearings of each corner post for rotational movement therewithin extended longitudinally through the center of the corner post. Each steering shaft has an upper end 41 extending outwardly through the first bearing and a lower end 42 extending in the opposite direction outwardly through the second bearing. A wheel assembly 43 is mounted on the lower end 42 of each steering shaft for ground engagement and pivotal movement with its respective steering shaft about the axis of rotation of the shaft. The teflon pad 39 engages the wheel assembly to assist pivotal movement of the wheel assembly relative to the pressure plate.

The main frame 25 has a pair of supporting members or I beams 44 mounted on the longitudinal frame members 31 in spaced substantially parallel relation. The I beams are mounted on the underside of the frame members 31 and extend transversely of the main frame, as can best be seen in FIGS. 1 and 2. The beams have opposite ends 45 which extend laterally of the main frame on opposite sides thereof. The beams form individual tracks or guideways 46 which face each other on the main frame. The opposite ends 45 of the I beams on the same side of the main frame are interconnected by crosspieces 47. A grid-type platform 48 is secured on the I beams 44 of the main frame 25 between the longitudinal frame members 31, as best shown in FIG. 2. The platform is mounted so as to be substantially horizontal when the apparatus is supported on a level surface. A railing 49 is affixed on the platform in upstanding relation. A ladder 50 is mounted on the platform extending downwardly toward the earth's surface 11 to provide access to the platform.

An engine 55, having exhaust pipe 56, is borne by the platform 48 for powering the apparatus 10 in the direction indicated in FIG. 2 and to the right, as viewed in FIG. 3. A hydraulic reservoir 57 is mounted on the platform 48 adjacent to the engine, as best shown in FIG. 2.

Figure 11:
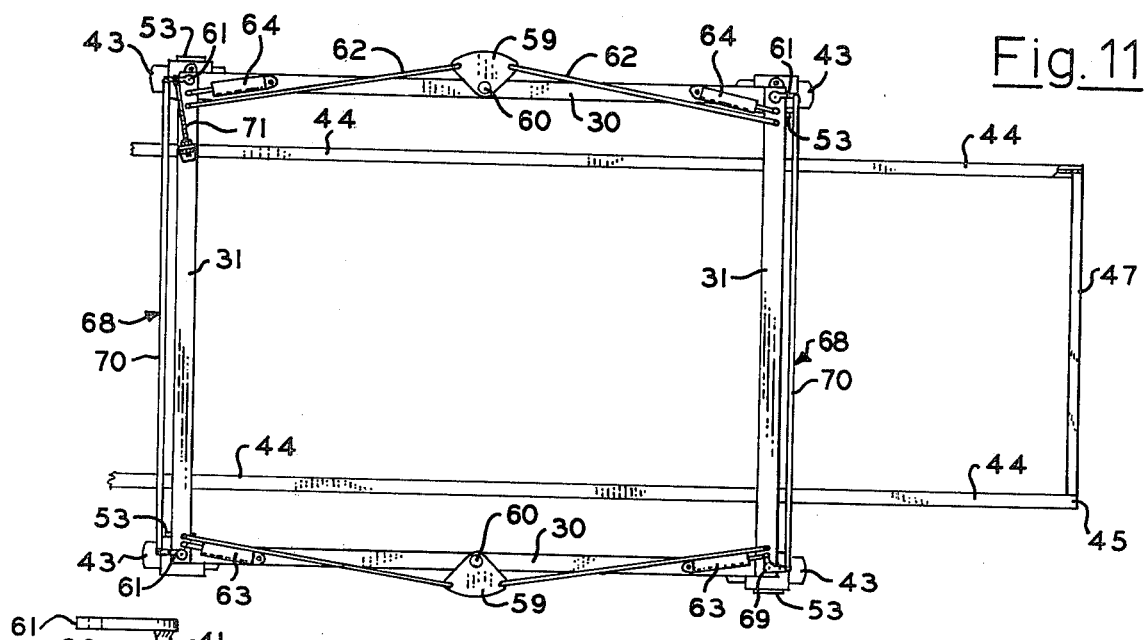
FIG. 11 is a fragmentary horizontal section of the main frame of the apparatus showing its arrangement for road travel.

A pair of steering assemblies 58 are individually fastened on the main frame 25, as best shown in FIGS. 2 and 11. Each steering assembly has a pivot plate 59 which is pivotally mounted at pivotal connection 60 centrally of and on top of each of the transverse frame members 30 of the main frame. A lever arm 61 is borne by the upper end 41 of each steering shaft 40. The pivot plate of the steering assembly 58 nearest the bottom of FIG. 2 is individually connected to the lever arms 61 of the front corner posts 26 and, correspondingly, the pivot plate of the other steering assembly to the lever arms of the rear corner posts by a pair of linkages 62.

A pair of front hydraulic cylinder assemblies 63 are mounted on the forward transverse frame member 30 and are individually connected to the lever arms 61 of the front corner posts 26. A pair of rear hydraulic cylinder assemblies 64 are secured on the rear transverse frame member 30 and are individually connected to the lever arms 61 of the rear corner posts 27. As will hereinafter be described in greater detail, extension and contraction of the cylinder assemblies 63 and 64 operates the steering assemblies 58 for guidance of the apparatus 10.

As shown in FIG. 11, the apparatus 10 has a pair of auxiliary steering assemblies 68 which are employed in steering the apparatus during travel in other than its normal operative environment, such as along roadways. The auxiliary steering assembly 68 on the right, as viewed in FIG. 11, has an auxiliary lever arm 69 which is adapted individually to be affixed on the shaft 40 of the front corner post 26 on the right as viewed in FIG. 11. The auxiliary lever arm 69 is mounted on the shaft 40 in place of and after removal of the normal lever arm 61. Each auxiliary steering assembly has a boom 70 adapted for interconnection of the lever arms 61 and 69 on the right in FIG. 11 and the lever arms 61 on the left when the steering shafts are oriented as shown in FIG. 11. The cylinder assembly 63 on the right, as viewed in FIG. 11, is, in the auxiliary mode, connected to the auxiliary lever arm and the cylinder assembly 64 on the right, as viewed in FIG. 11, is simply disconnected from lever arm 61. A locking assembly 71 is mounted on the apparatus so as to interconnect the lever arm 61 and the frame member 31 adjacent thereto, as shown in FIG. 11. Thus, the lever arms 61 on the left are locked in parallel non-steerable relation in the auxiliary mode by the locking assembly 71.

It will be seen that when the steering assemblies 58 are employed, the booms 70 of the auxiliary steering assemblies 68 are disconnected from the lever arms, as shown in FIG. 2. Conversely, when the auxiliary steering assemblies are employed, the linkages 62 of the steering assemblies 58 are disconnected from the lever arms, as shown in FIG. 11.

The apparatus 10 has a plurality of harvesting units 75 borne by the main frame 25. The specific number of such harvesting units to be employed is not of critical importance. A single harvesting unit can be mounted on the apparatus and operated as will be described. However, it is preferred that four such harvesting units be mounted on the main frame to permit harvesting of four rows of grapevines 12 simultaneously.

Figure 7:
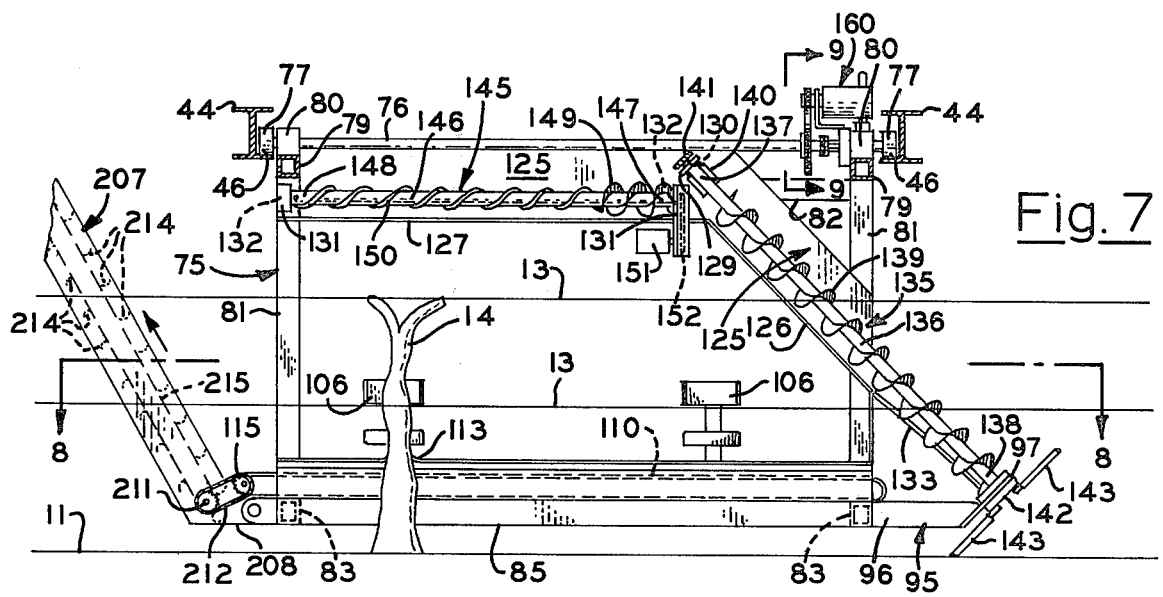
FIG. 7 is a somewhat enlarged, fragmentary longitudinal vertical section taken from a position indicated by line 7—7 in FIG. 5.
Figures 9, 10:
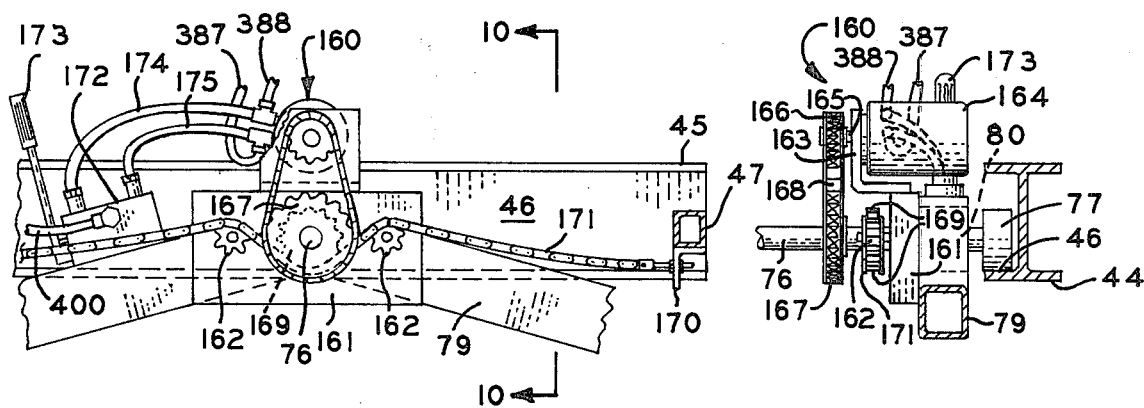
FIG. 9 is a somewhat enlarged, fragmentary transverse vertical section taken from a position indicated by line 9—9 in FIG. 7.
FIG. 10 is a fragmentary longitudinal vertical section taken from a position indicated by line 10—10 in FIG. 9.

The harvesting units 75 are substantially identical in construction. Each harvesting unit has a support shaft 76 having a pair of support wheels 77 individually mounted at the opposite ends thereof and received for rolling movement in the guideways 46 of the I beams 44, as best shown in FIGS. 7 and 10. The shafts of the four harvesting units are substantially equally spaced extending between the I beams parallel to the direction of travel of the apparatus 10. Each harvesting unit has a subframe 78 mounted on its respective support shaft and suspended therebelow. The subframe has a pair of arched beams 79 having a bearing 80 at the apex thereof, such as shown in FIGS. 5 and 7. Corner posts 81 are individually affixed, as by welding, on the opposite ends of the arched beams extending vertically in depending relation therebelow. The corner posts on common sides of each subframe are interconnected by upper longitudinal frame members 82 extending substantially horizontally therebetween and parallel to each other. Four transverse frame members 83 are individually secured, as by welding, on the lower ends of each of the corner posts, as can best be seen in FIGS. 5 and 7. A pair of outer longitudinal frame members 84 interconnect the transverse frame members 83 extending longitudinally of the subframe in substantially parallel relation. A pair of inner longitudinal frame members 85 interconnect the transverse frame members of each subframe and define a longitudinal pathway or passage 86 extending through the subframe in alignment with the direction of travel of the apparatus, as can best be seen in FIG. 5. Each subframe 78 is pivotally suspended from its respective support shaft 76 for pivotal movement about that shaft.

Figure 8:
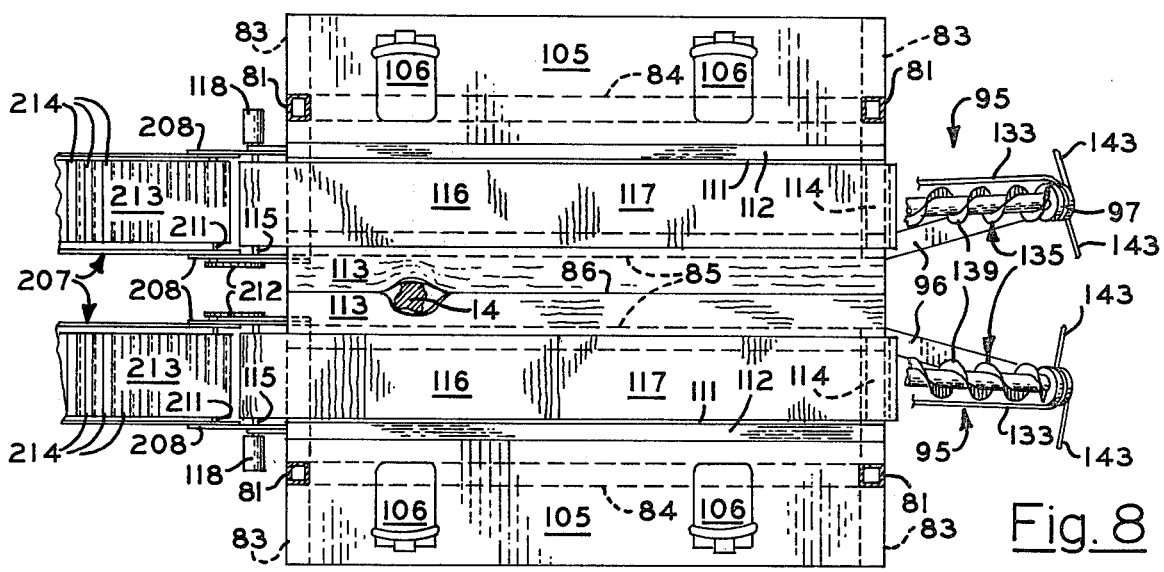
FIG. 8 is a fragmentary horizontal section taken from a position indicated by line 8—8 in FIG. 7.

Each subframe 78 has a pair of forward frames 95 mounted on the leading portion of the subframe with respect to the direction of travel of the apparatus spaced on opposite sides of the longitudinal passage 86. Each forward frame has a forward beam 96 mounted on the forward transverse frame member 83 in approximate endward alignment with the inner longitudinal frame member 85 and extended substantially horizontally forwardly from the subframe, as best shown in FIGS. 7 and 8. The forward beams of the frames 95 of each harvesting unit diverge from each other in the direction of travel of the apparatus. As shown in FIG. 7, a mounting plate 97 is secured on the forwardmost end of each forward beam 96 extending upwardly and forwardly therefrom at a predetermined angle. A bearing 98 is borne by each mounting plate defining an axis of rotation which is inclined rearwardly of the apparatus with respect to the direction of travel of the apparatus. The axes of rotation defined by the bearings of each harvesting unit 75 are convergent upon each other to a slight degree as can best be visualized in FIG. 8.

A pair of platforms 105 are individually affixed on the frame members 83, 84 and 85, on opposite sides of their respective longitudinal passage 86. A pair of seats 106 are individually mounted on each of the platforms of each harvesting unit facing the longitudinal passage and spaced therefrom, as shown in FIG. 8. For illustrative convenience, representative field workers are indicated in dashed lines at 107 in FIG. 5. The subframe 78 defines a harvesting or work station 108 within which the seats 106 are situated.

Each subframe 78 mounts a pair of conveyor assemblies 110 extending longitudinally of the subframe and spaced on opposite sides of the passage 86. The conveyor assembly of each pair has a trough 111 constructed, for example, of sheet metal. Each trough has a lip 112 extending upwardly and laterally therefrom on the side of the trough remote from the passage 86. A flexible panel 113 is fastened on each trough on the side thereof opposite to the lip 112. The panels 113 of each pair of conveyor assemblies extend toward each other into the passage 86, as best shown in FIG. 5. An idler roller assembly 114 is mounted on each trough adjacent to the forward frame 95 of the subframe for rotation in the trough about an axis normal to the intended direction of travel of the apparatus 10. A drive roller assembly 115 is mounted on each trough parallel to, and remote from, the idler roller assembly for rotation about an axis normal to the direction of travel of the apparatus. A conveyor belt 116 is extended in driven relation about the roller assemblies 114 and 115 to define an upper run 117. An hydraulic drive motor 118 is secured on each trough in driving engagement with the drive roller assembly of that conveyor assembly. The drive motor is operable to drive the upper run of the conveyor belt of its respective conveyor assembly in a direction rearwardly in the subframe and to the left, as viewed in FIG. 8.

Each of the subframes 78 mounts a pair of auger or guide chutes 125 which face each other in predetermined spaced relation, as shown in FIG. 5. Each of the guide chutes has an inclined portion 126 which is secured on the adjacent front corner post 81 and upper longitudinal frame member 82. Each guide chute has a horizontal portion 127 connecting with its respective inclined portion and fastened on the adjacent upper longitudinal frame member 82 and the rear corner post 81. The guide chutes of each subframe are spaced to define a pathway or passage 128 in vertical alignment with the longitudinal passage 86 therebelow. An upper mounting plate 129 is mounted on the inclined portion of each guide chute. An upper bearing 130 is borne by each mounting plate 129 in alignment with the bearing 98 on its respective side of the subframe to define with the bearing 98 an axis of rotation extending diagonally upwardly and rearwardly and slightly upwardly convergent upon the passage 128, as best shown in FIGS. 2, 7 and 8. A pair of mounting plates 131, individually mounting bearings 132, ae mounted on the horizontal portion 127 of each guide chute and at the opposite ends thereof. The bearings 132 of each horizontal portion define an axis of rotation extending horizontally and approximately parallel to their respective chute and the direction of travel of the apparatus. A guide bar 133 is mounted on and extends between the forward end of each forward beam 96 and the lower end to the inclined portion 126 of its respective guide chute 125. Each guide bar is spaced laterally of the axis of rotation defined by the bearings 98 and 130 of its respective forward frame 95, as can best be seen in FIGS. 2, 6 and 7.

An auger assembly 135 is mounted in the bearings 98 and 130 of the inclined portion 126 of each guide chute 125. Each auger assembly has a shaft 136 mounted for rotational movement in the bearings 98 and 130. The shaft has an upper end 137 and a lower end 138 which are individually received in bearings 130 and 98 respectively. An auger blade 139 is secured, as by welding, on and about the shaft of each auger assembly between the upper and lower ends thereof. The auger blades of each harvesting unit 75 are wound in helices about their respective shafts. A hydraulic drive motor 140 is mounted on each upper mounting plate 129 and connected by a drive linkage 141 in driving relation to the upper end 137 of its respective shaft 136. An end plate 142 is secured on the lower end 138 of each shaft 136 in substantially normal relation to the axis of rotation of the shaft and on the opposite side of the bearing 98 from the auger blade, as best shown in FIG. 7. A pair of tangential fingers 143 are secured on each end plate, as can best be seen in FIG. 6, and are preferably constructed of a semi flexible material such as rubber hose. As will hereinafter be described, the hydraulic motors 140 are adapted to rotate the auger assemblies 135 of the harvesting units 75 in opposite directions. As viewed on the harvesting unit 75 on the far left in FIG. 1, the auger assembly 135 on the left is adapted to be rotated in a counterclockwise direction and the auger assembly on the right is adapted to be rotated in a clockwise direction. The fingers, being secured on the end plate of each auger assembly are moved in the same direction as the end plate, as can best be visualized in FIG. 6.

A horizontal drive assembly 145 is mounted for rotational movement in the pair of bearings 132 of the horizontal portion 127 of each auger chute 125. The horizontal drive assembly has a shaft 146 having a forward end 147 and a rearward end 148 which are individually mounted for rotational movement in the bearings 132. A horizontal auger blade 149 is helically wound about a portion of each shaft 146 adjacent to the forward end thereof. Each horizontal auger blade is formed so as to correspond to that of the auger blade 139 on its respective side of the harvesting unit 75 and for rotation in the same direction. A rod 150 is helically wound about each shaft 146 throughout the substantial part of the length thereof rearwardly of the horizontal auger blade as best shown in FIG. 7. A hydraulic drive motor 151 is borne by the mounting plate 131 of each horizontal drive assembly 145 and is connected in driving relation to the forward end 147 of the shaft 146 by a drive linkage 152. As will hereinafter be seen, the hydraulic drive motors 151 are adapted to rotate the horizontal drive assemblies 145 in opposite directions individually corresponding to those of their respective auger assemblies 135. As viewed in FIG. 5, the drive assembly 145 on the left in that view is adapted to be rotated by its respective drive motor in a counterclockwise direction and the drive assembly on the right, as viewed therein, is adapted to be rotated by its respective drive motor in a clockwise direction.

Each of the harvesting units 75 has an alignment assembly 160. Each alignment assembly has a mounting plate 161 which is secured as by welding on the arched beam 79 adjacent to the forward end of the harvesting unit with the support shaft 76 extended rotationally therethrough. A pair of idler sprockets 162 are mounted for rotational movement on the mounting plate in spaced relation and on opposite sides of the support shaft, as best shown in FIG. 9. An angle bracket 163 is fastened on the mounting plate extending upwardly therefrom, as best shown in FIG. 10. A hydraulic motor 164 is borne by the angle bracket and has a drive shaft 165 extended rotationally through the bracket. A drive sprocket 166 is affixed on the drive shaft on the opposite side of the angle bracket from the hydraulic motor and above the support shaft 76, as shown in FIG. 10. A first shaft sprocket 167 is mounted on the support shaft 76 in vertical alignment with the drive sprocket 166 thereabove. A drive chain 168 is extended in driving relation about the drive sprocket 166 and first shaft sprocket 167. A second shaft sprocket 169 is secured on the support shaft 76 in alignment with the idler sprockets 162, as best shown in FIG. 9.

A pair of brackets 170 are individually mounted on the cross pieces 47 of the main frame 25 in alignment with the idler sprockets 162 and second shaft sprocket 169 of all of the harvesting units 75, as best shown in FIG. 9. A positioning chain 171 is secured on the brackets 170 extending therebetween and individually extended over the idler sprockets 162 and under the second shaft sprocket 169 of each harvesting unit 75.

A manual hydraulic control valve 172 is mounted on the arched beam 79 of each harvesting unit 75. Each control valve 172 has a lever arm assembly 173 mounted thereon for manual operation of the valve. Each control valve is operationally linked to the hydraulic motor 164 by a pair of hydraulic conduits 174 and 175. As can best be visualized in FIGS. 9 and 10, manual or automatic operation of the hydraulic control valve 172, as will hereinafter be described, causes the hydraulic motor 164 to be operated to rotate the support shaft 76 of its respective harvesting unit 75 through the drive linkage of drive sprocket 166, first shaft sprocket 167 and drive chain 168. Rotation of the support shaft 76 similarly causes the second shaft sprocket 169 mounted thereon to be rotated in the same direction thereby to position the subframe 78 and thus the harvesting unit 75 laterally on the I beams 44. This operation is performed for precise alignment of the harvesting unit with a row of grapevines 12.

Figure 13:
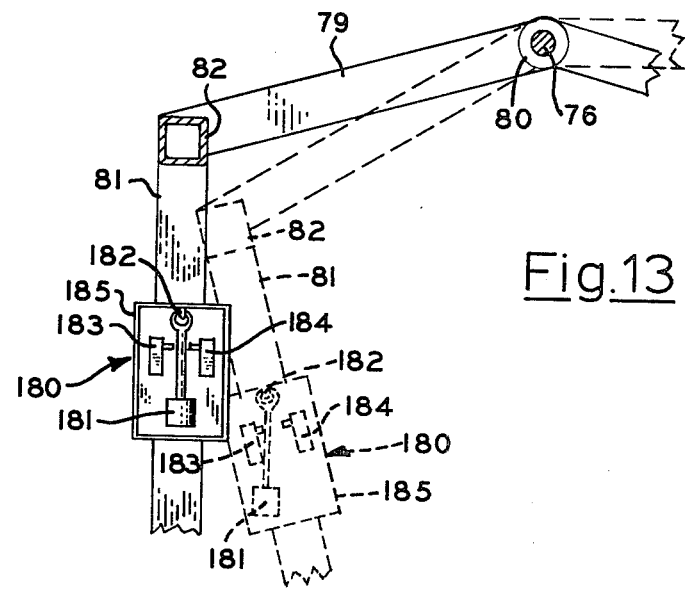
FIG. 13 is a somewhat enlarged, fragmentary front elevation of a subframe of the apparatus showing the attitude sensor mounted thereon with a portion of the housing removed to expose its working elements.
Figure 15:
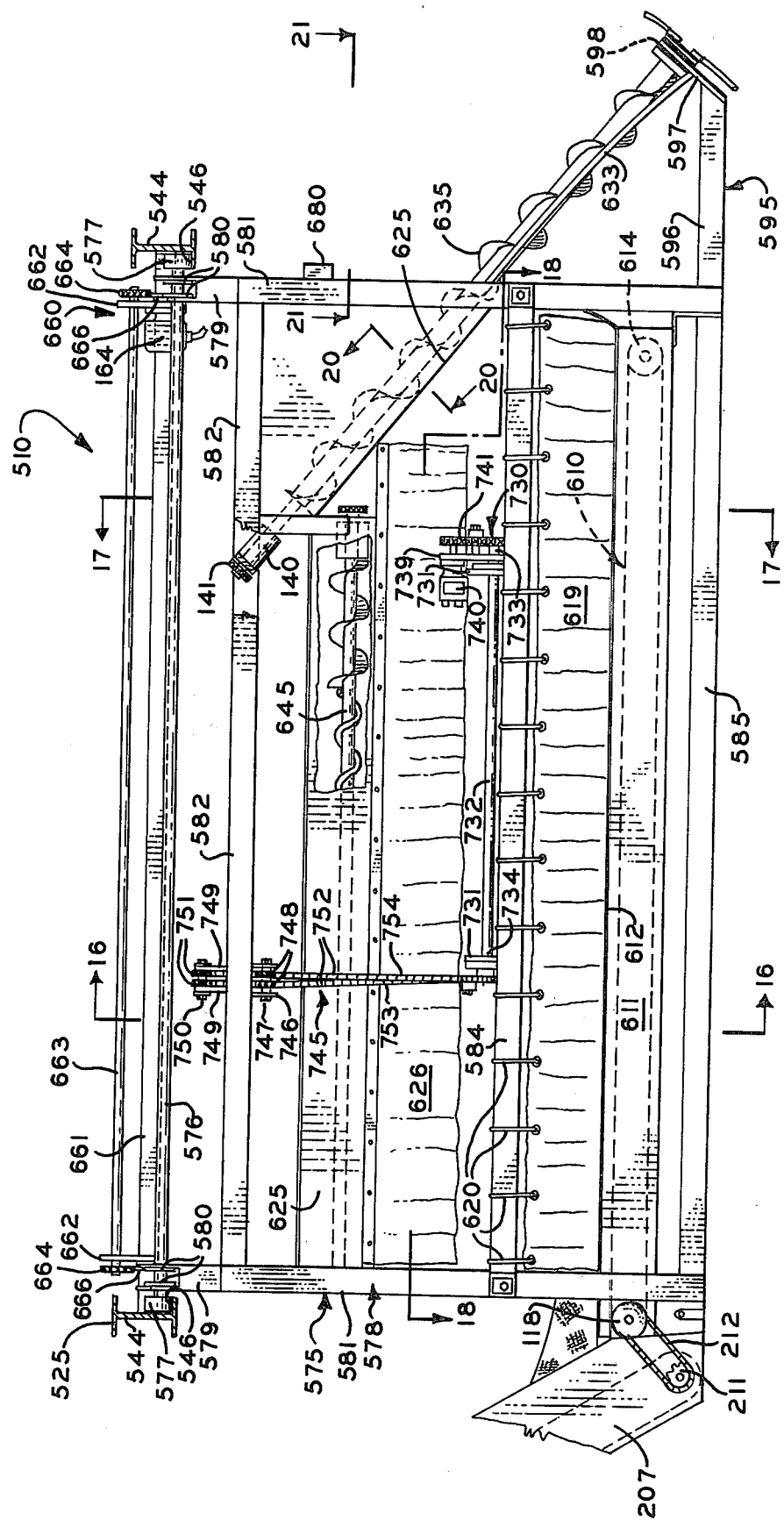
FIG. 15 is a fragmentary side elevation of a harvesting unit of the apparatus of the second form of the present invention.

Each harvesting unit 75 has an attitude sensor 180, as shown in FIG. 13. Each sensor has a pendulum 181 which is pivotally mounted at any suitable location on its respective subframe 78 such as on a corner post 81 by mount 182. First and second microswitches 183 and 184 respectively are affixed on the corner post, as shown in FIG. 15, on opposite sides of the pendulum and adapted individually to be tripped upon movement of the pendulum thereto. The pendulum and microswitches are preferably contained within a dust proof housing 185.

A pair of support frames 190 are individually mounted on the rear corner posts 27 of the main frame 25 extending rearwardly therefrom, as best shown in FIG. 3. A collection conveyor assembly 191 is secured on the support frames extending transversely of the normal operational direction of travel of the apparatus 10. The conveyor assembly has a trough 192 affixed on the support frames. A drive roller assembly 193 is mounted for rotational movement on the trough on the left, as viewed in FIG. 2. A drive roller assembly 194 is mounted for rotational movement on the trough on the right, as viewed. A conveyor belt 195 is operably extended about the assemblies 193 and 194 for rotation thereabout and has an upper run 196. The conveyor assembly extends to the discharge end 197 on the far right of FIG. 2. A pair of hydraulic drive motors 198 are individually mounted on the conveyor assembly 191 in driving relation to the drive roller assemblies 193 and 194 for driving of the conveyor belt to transport the upper run 196 thereof to the right, as viewed in FIG. 2, to the discharge end of the conveyor assembly.

Figure 14:
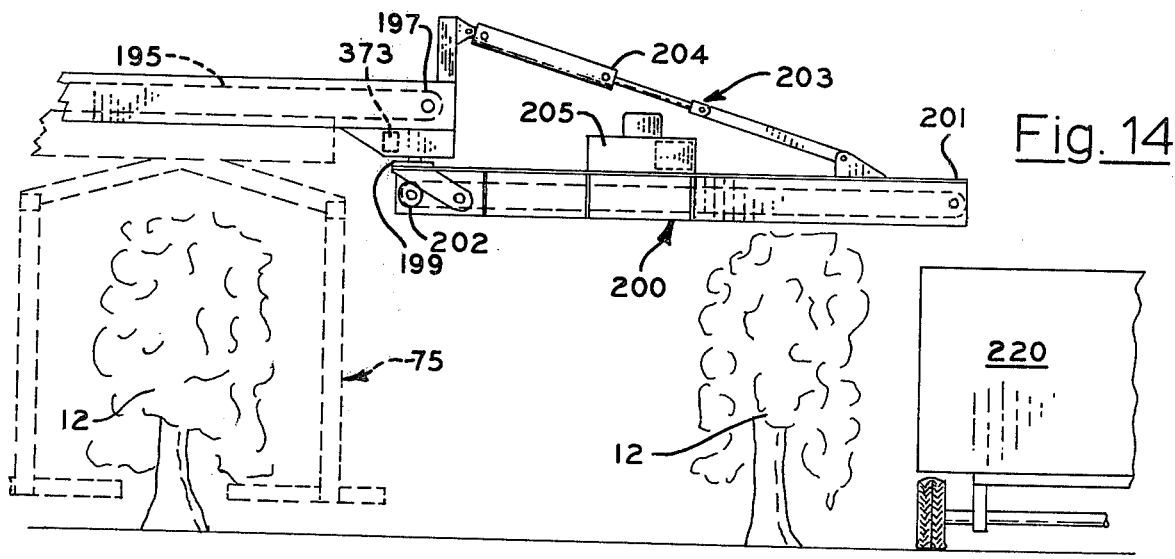
FIG. 14 is a fragmentary front elevation of a portion of the apparatus shown in a representative operative environment.

A pivotal mounting assembly 199 is borne on the underside of the discharge end 197 of the conveyor assembly 191. A discharge conveyor assembly 200 is mounted on the mounting assembly 199 for selective positioning in endward alignment with the conveyor assembly 191, as shown in FIG. 14, or to a withdrawn position, not shown, substantially parallel to the normal operational direction of travel of the apparatus. A hydraulic drive motor 202 is mounted on the discharge conveyor assembly in driving relation thereto so that grape bunches dropped onto the conveyor assembly 200 by the conveyor assembly 191, as will hereinafter be described, is transported therefrom and off the discharge end 201 laterally of the apparatus, as shown in FIG. 14. A hydraulic lifting assembly 203, operable by hydraulic cylinders 204, interconnects the discharge end 197 of the conveyor assembly 191 and the conveyor assembly 200. An hydraulically operated vacuum fan 205 is mounted on the conveyor assembly 200 in spaced relation to the discharge end 197 of conveyor assembly 191, as best shown in FIG. 14. The vacuum fan extends over the conveyor assembly and is operable vacuumatically to draw off and discharge leaves, canes, dirt and other extraneous material from grapes transported along the conveyor assembly, as will hereinafter be described. The vacuum fan has a hydraulic drive motor 206 connected in driving relation thereto. Several such vacuum fans 205 can be mounted on the conveyor assemblies 191 and 200, if desired, for the removal of the extraneous material.

A pair of lifting conveyor assemblies 207 are mounted on each harvesting unit 75 in individual alignment with the conveyor assemblies 110. Each lifting conveyor assembly 207 has a frame 208 which is secured on one of the transverse frame members 83 of the subframe 78 of its respective harvesting unit. The frame of each conveyor assembly 207 extends rearwardly of the subframe in alignment with one of the conveyor assemblies 110 of the subframe and extends upwardly therefrom, as best shown in FIGS. 3, 7 and 8. Each frame 208 has a lower end 209 borne by the rearward transverse frame member 83 and an opposite upper end 210 disposed in an elevated position, as shown in FIG. 3. A pair of roller assemblies 211 are mounted on the frame extending transversely thereof individually adjacent to the upper and lower ends of the frame. A drive linkage 212 interconnects in driving relation the drive roller assembly 115 of each conveyor assembly 110 and the roller assembly 211 of its respective lifting conveyor assembly 207.

A conveyor belt 213 is extended in driven relation about the roller assemblies 211 of each conveyor assembly 207. The conveyor belt mounts a plurality of panels or buckets 214 extending transversely thereof, as can best be seen in FIG. 7. The conveyor belt is driven from its respective conveyor assembly 110 through the drive linkage 21 to define an upper run 215 which is transported along a path of travel upwardly and rearwardly from the harvesting unit 75. As can be seen in FIGS. 2 and 3, the upper ends 210 of the lifting conveyor assemblies 207 terminate in corresponding positions rearwardly elevated from the subframes 78 of the apparatus 10 and extending over the conveyor assembly 191.

As shown in FIG. 14, the apparatus 10 is adapted to be used in conjunction with a trailer or gondola 220 which is transported in the path between two rows of grapevines adjoining the apparatus. The gondola is motivated along under the discharge end 201 of the discharge conveyor assembly to receive the harvested grape bunches.

It will become apparent that the apparatus 10 of the present invention could be operated by a variety of drive and control systems. However, the systems hereinafter described are preferred and are representative of those types of systems which can be employed to operate the apparatus.

Figure 23:
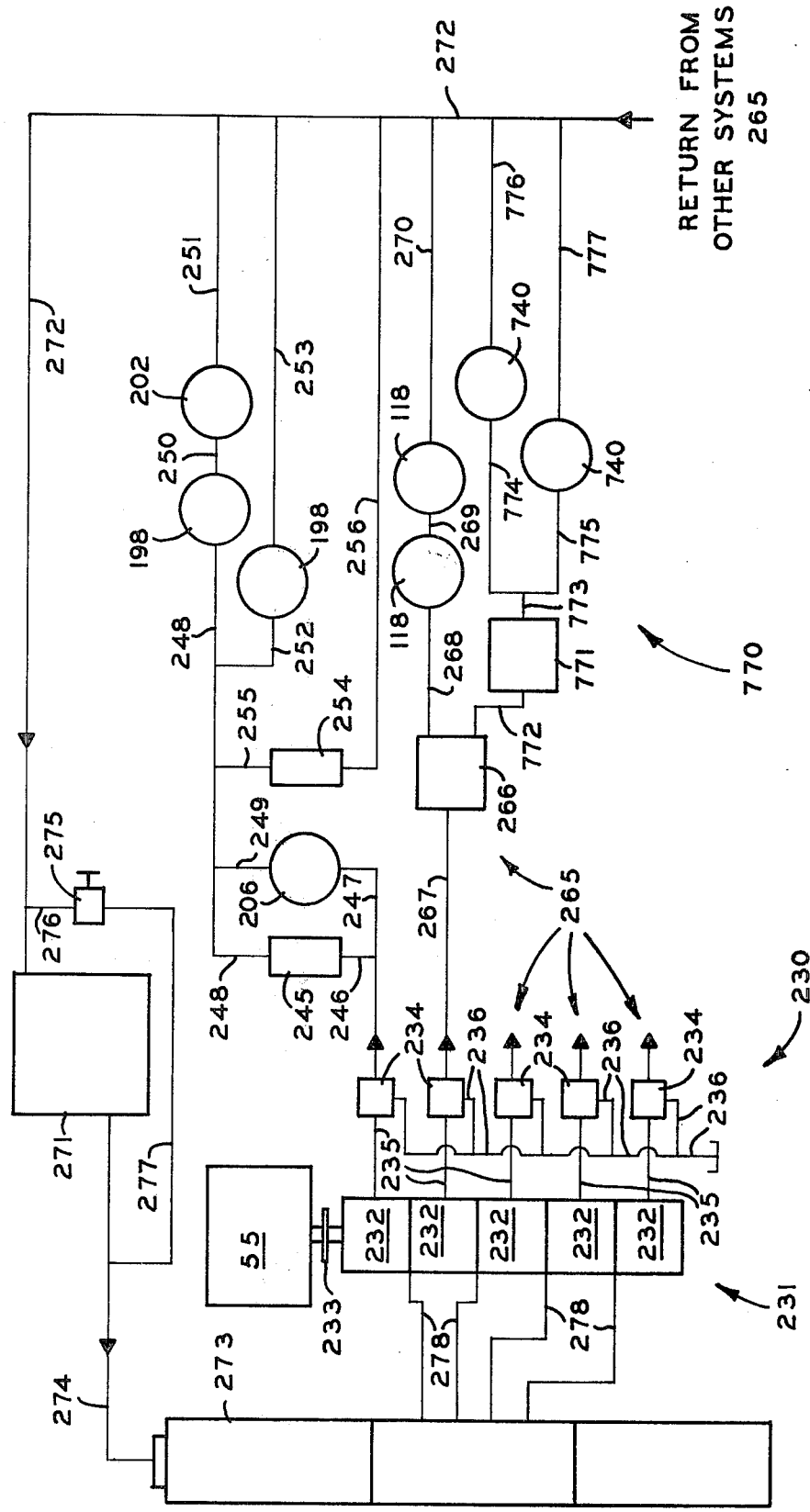
FIG. 23 is a fragmentary schematic diagram of the main hydraulic drive system of the present invention.

The apparatus 10 has a main hydraulic system 230 which is shown in the schematic diagram of FIG. 23. The main hydraulic system has a main pump 231 which has five individual pump sections 232. A pump drive coupling 233 operably interconnects the engine 55 and the main pump 231 so that the engine is operated to drive the main pump. The system 230 has five solenoid operated pressure relief valves 234. Five hydraulic conduits 235 individually interconnect each pump section 232 and one of the relief valves 234. Pressure relief conduits 236 are individually connected to the relief valves. The pressure relief valves 234 individually operate to discharge hydraulic fluid from the system 230 through the conduits 236 when pressure within any portion of the system connecting with one or more of the pump sections 232 reaches a predetermined maximum pressure.

The hydraulic system 230 has a by-pass flow control 245. A hydraulic conduit 246 operably interconnects the upper pressure relief valve 234, as shown in FIG. 23, and the flow control 245. A hydraulic conduit 247 operably interconnects hydraulic conduit 246 and the hydraulic motor 206 of the blower fan 205. The fan is thus powered hydraulically during operation of the apparatus to conduct a flow of air transversely of the path of discharge of grapes from the conveyor assembly 191 onto the discharge conveyor assembly 200. The flow of air operates to separate trash from the grapes as they are deposited on the conveyor assembly 200.

A hydraulic conduit 248 interconnects the flow control 245 and one of the hydraulic drive motors 198 of the conveyor assembly 191. A hydraulic conduit 249 interconnects the fan 205 and hydraulic conduit 248. Thus, the flow control 245 and the hydraulic motor 206 are connected in the system 230 in parallel relation, as shown in FIG. 23. An hydraulic conduit 250 interconnects the drive motor 198 to which conduit 248 is connected and the hydraulic drive motor 202 of the discharge conveyor assembly 200. A hydraulic conduit 251 is connected to and extended from the hydraulic drive motor 202, as shown in FIG. 23. A hydraulic conduit 252 interconnects conduit 248 and the other hydraulic motor 198 of the conveyor assembly 191. A hydraulic conduit 253 is extended from drive motor 198 to which conduit 252 is connected, as shown in FIG. 23.

The system 230 has a by-pass flow control 254. A hydraulic conduit 255 interconnects conduit 248 and the flow control 254. A hydraulic conduit 256 is connected to and extended from the by-pass flow control 254, as shown in the same FIG. Thus, it will be seen that the pair of drive motors 198 are connected in the system in parallel. The drive motor 198 to which conduit 248 is connected and drive motor 203 are connected in the system in series relation.

The main hydraulic system 230 has four harvesting unit conveyor drive systems 265. For purposes of illustrative convenience, only one such conveyor drive system 265 is shown in FIG. 23 and described. It will be understood that the other three drive systems 265 are identical in structure and operation to that to be described. Each of the four drive systems 265 is individually connected to one of the harvesting units 75 for the operation thereof.

Each conveyor drive system 265 has a gear flow divider 266. A hydraulic conduit 267 of each drive system 265 operably interconnects a predetermined one of the relief valves 234 and the gear flow divider 266 thereof. An hydraulic conduit 268 interconnects the gear flow divider and one of the hydraulic drive motors 118 of one of the conveyor assemblies 110 for its respective harvesting unit 75. A hydraulic conduit 269 operably interconnects the hydraulic drive motors 118. A hydraulic conduit 270 is extended from the hydraulic drive motor 118 on the right in FIG. 23. Thus, it will be seen that the gear flow divider 266 and hydraulic drive motors 118 are connected in the drive system 265 in series relation. The gear flow divider 266 is employed in the second embodiment of the present invention hereinafter to be described, but is included herein for subsequent illustrative convenience. Otherwise, the hydraulic drive motor 118 on the left as viewed in FIG. 23 could be directly linked, by way of a hydraulic conduit, with its respective pressure relief valve 234.

The main hydraulic system 230 has a heat exchanger 271. A hydraulic conduit 272 interconnects the lines 270 of the four conveyor drive systems 265, hydraulic conduit 256, hydraulic conduit 253, and hydraulic conduit 251 with the heat exchanger 271 thereby acting as a return line. The system 230 has a return conduit filter 273. An hydraulic conduit 274 operably interconnects the heat exchanger 271 and the return conduit filter 273. The system 230 has a heat exchanger by-pass valve 275. A hydraulic conduit 276 operably interconnects conduit 272 and the by-pass valve 275. A hydraulic conduit 277 operably interconnects the by-pass valve 275 and the hydraulic conduit 274. Thus, it will be seen that the heat exchanger 271 and the by-pass valve 275 are connected in parallel relation in the system. Four hydraulic conduits 278 individually interconnect the return conduit filter 273 and the sections 232 of the main pump 231 thereby completing the hydraulic circuit of the main hydraulic system 230 of the first embodiment of the present invention.

Figure 24:
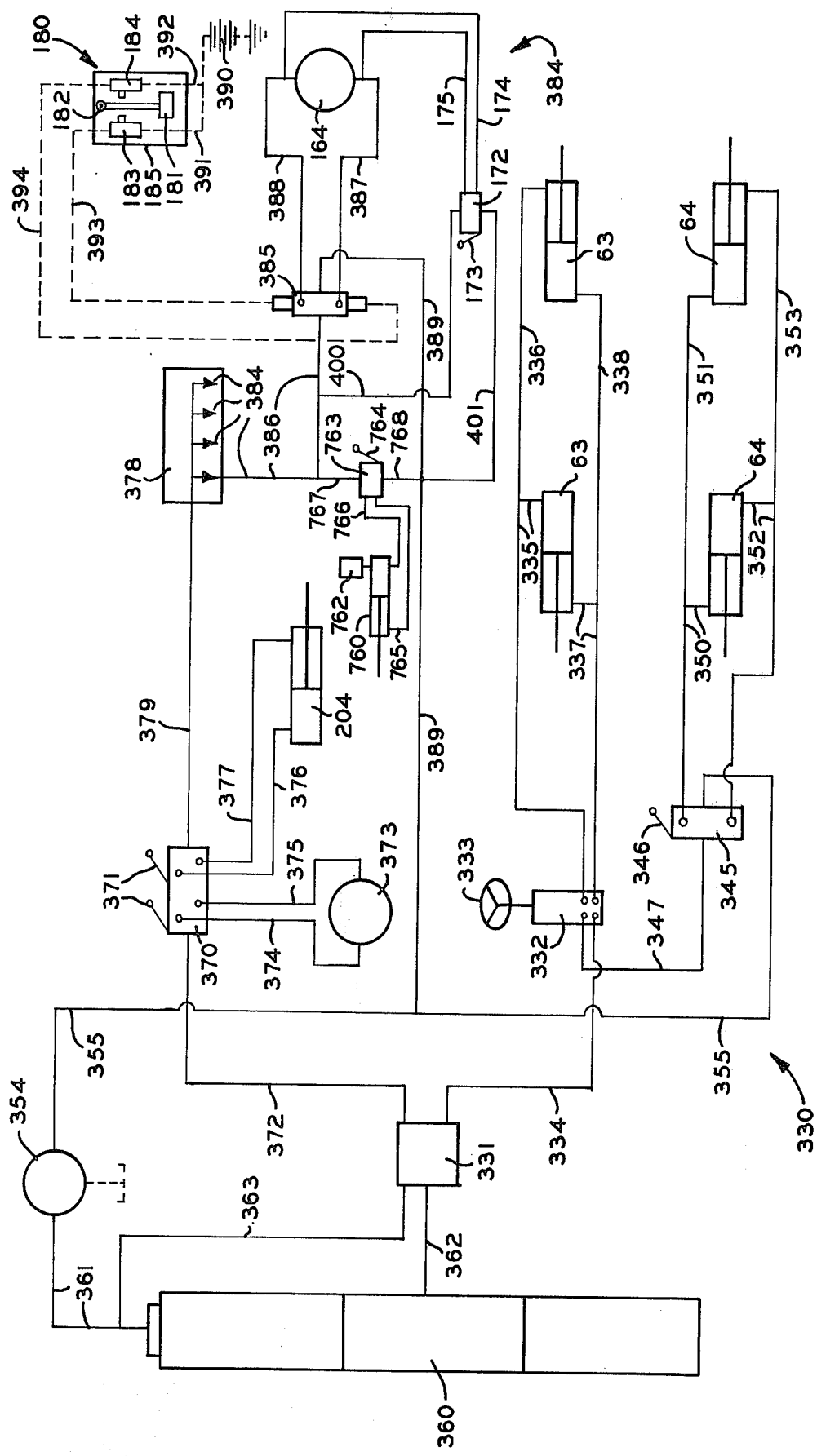
FIG. 24 is a fragmentary schematic diagram of the auxiliary hydraulic system of the present invention.

An auxiliary hydraulic system 330 for the apparatus 10 is shown in the schematic diagram of FIG. 24. The auxiliary hydraulic system 330 has an auxiliary hydraulic pump 331. The hydraulic system 330 has an orbitrol steering valve 332 mounting a steering wheel 333 in controlling relation thereon. A hydraulic conduit 334 operably interconnects the auxiliary pump 331 and the steering valve 332 in fluid supplying relation. An hydraulic conduit 335 operably interconnects the steering valve 332 and the hydraulic steering assembly 63 on the left, as viewed in FIGS. 1 and 24. A hydraulic conduit 336 operably interconnects hydraulic conduit 335 and the hydraulic cylinder assembly 63 on the right, as viewed in FIGS. 1 and 24. A hydraulic conduit 337 operably interconnects the hydraulic cylinder assembly 63 on the left in FIG. 24 and the steering valve 332. An hydraulic conduit 338 operably interconnects hydraulic cylinder assembly 63 on the right in FIG. 24 and hydraulic conduit 337. Thus, it will be seen that the hydraulic cylinder assemblies 63 are connected in parallel in the system 330 for steering of their respective front wheel assemblies 43 upon operation of the steering valve 332 with the steering wheel 333.

The auxiliary hydraulic system 330 has a rear wheel steering control valve 345 mounting a control lever 346 thereon for operation of the valve. A hydraulic conduit 347 operably interconnects the orbitrol steering valve 332 and the steering control valve 345 in fluid supplying relation. A hydraulic conduit 350 operably interconnects the steering control valve 345 and the hydraulic cylinder assembly 64 on the left as viewed in FIGS. 1 and 24. A hydraulic conduit 351 operably interconnects conduit 350 and the hydraulic cylinder assembly 64 on the right as viewed in FIGS. 1 and 24. An hydraulic conduit 352 operably interconnects the hydraulic cylinder assembly 64 on the left as viewed in FIGS. 1 and 24 and the steering valve 345 in fluid returning relation. An hydraulic conduit 353 operably interconnects the hydraulic cylinder assembly 64 on the right in FIGS. 1 and 24 and the hydraulic conduit 352. Thus it will be seen that the hydraulic cylinder assemblies 64 are connected in parallel relation and are made controllable from the steering valve 332 by actuation of the lever 346 of the control valve 345.

The auxiliary hydraulic system 330 has an hydraulic motor 354 which is connected in driving relation to the heat exchanger 271. A hydraulic conduit 355 operably interconnects the rear wheel steering control valve 345 and the hydraulic motor 354.

The auxiliary hydraulic system 330 has a return conduit filter 360. An hydraulic conduit 361 interconnects the hydraulic motor 354 of the heat exchanger 271 and the filter 360. An hydraulic conduit 362 interconnects the filter 360 and the auxiliary pump 331. A hydraulic conduit 363 interconnects the auxiliary pump and the hydraulic conduit 361.

The auxiliary hydraulic system 330 has a discharge conveyor control valve 370 mounting a pair of control levers 371. A hydraulic conduit 372 operably interconnects the pump 331 and the control valve 370. The hydraulic system 330 has a discharge conveyor swing motor 373 which is connected in driving relation to the pivotal mounting assembly 199. An hydraulic conduit 374 operably interconnects the control valve 370 and the swing motor 373 in fluid supplying relation. An hydraulic conduit 375 operably interconnects the swing motor 373 and the control valve 370 in return relation. An hydraulic conduit 376 operably interconnects the control valve 370 and the hydraulic cylinder 204 of the discharge conveyor assembly 200. A hydraulic conduit 377 operably interconnects the hydraulic cylinder 204 and the control valve 370 in return relation. The auxiliary hydraulic system 330 also has a flow divider 378. A hydraulic conduit 379 operably interconnects the control valve 370 and the flow divider 378 in fluid supplying relation.

The auxiliary hydraulic system 330 has a plurality of harvesting unit alignment or control systems 384. As previously noted in relation to other portions of the apparatus 10, the specific number of systems is dependent upon the number of harvesting units 75 mounted on the apparatus 10. In the preferred embodiment, the apparatus has four such harvesting units 75 and correspondingly the flow divider 378 has four outlets or, in other words, one outlet for each of the harvesting units. Accordingly, the apparatus in its preferred embodiment has four alignment systems 384. Only one such harvesting unit alignment system is described for purposes of clarity and illustrative convenience. However, it is understood that four such alignment systems are employed in individual connection with each of the harvesting units and individually communicating with the outlets of the flow divider.

Each harvesting unit alignment system 384 has a solenoid operated control valve 385. An hydraulic conduit 386 operatively interconnects its respective outlet of the flow divider 378 and the control valve 385. An hydraulic conduit 387 operatively interconnects the control valve 385 and the hydraulic motor 164 of the alignment assembly 160. An hydraulic conduit 388 operatively interconnects the hydraulic motor 164 and the control valve 385. Thus, it will be seen that the control valve 385 is operated, as hereinafter described, to direct hydraulic fluid in either of two directions through the conduits 387 and 388 and the hydraulic motor 164. A hydraulic conduit 389 operatively interconnects the control valve 385 and the hydraulic conduit 355 of the auxiliary hydraulic system 330.

Each harvesting unit alignment system has an electrical power source or battery 390 which is employed in conjunction with the unit. An electrical conductor 391 operatively interconnects the battery 390 and the first microswitch 113 of the attitude sensor 180 of that harvesting unit. An electrical conductor 392 operatively interconnects conductor 391 and the second microswitch 184. An electrical conductor 393 operatively interconnects the first microswitch 183 and one side of the solenoid operated control valve 385. An electrical conductor 394 operatively interconnects the second microswitch 184 and the opposite side of the solenoid operated control valve 385. It will be seen that deviation of the harvesting unit 75 to which the alignment system 384 is connected from vertical, such as by misalignment with its respective row of grapevines 12, causes the pendulum 181 to be swung by gravity in the opposite direction to close one of the microswitches 183 or 184 and cause current to flow from the battery 390 through one of the electrical conductors 393 or 394 to operate the control valve 385. Thus, for example, when microswitch 183 is closed by swinging of its pendulum, current flows from the battery through conductors 391 and 393 to the solenoid to cause the control valve 385 to be operated to permit hydraulic fluid to flow along hydraulic conduit 388 through the hydraulic motor 164 thereby operating the alignment assembly 160 to realign that harvesting unit 175 with its respective row of grapevines.

A hydraulic conduit 400 operatively interconnects hydraulic conduit 386 and the manual hydraulic control valve 172 in fluid supplying relation. Hydraulic conduit 401 interconnects valve 172 and hydraulic conduit 389 in return relation. Operation of the valve 172 using lever arm assembly 173 permits each harvesting unit to be manually positioned for precise alignment with their respective rows of grapevines 12.

Figure 25:
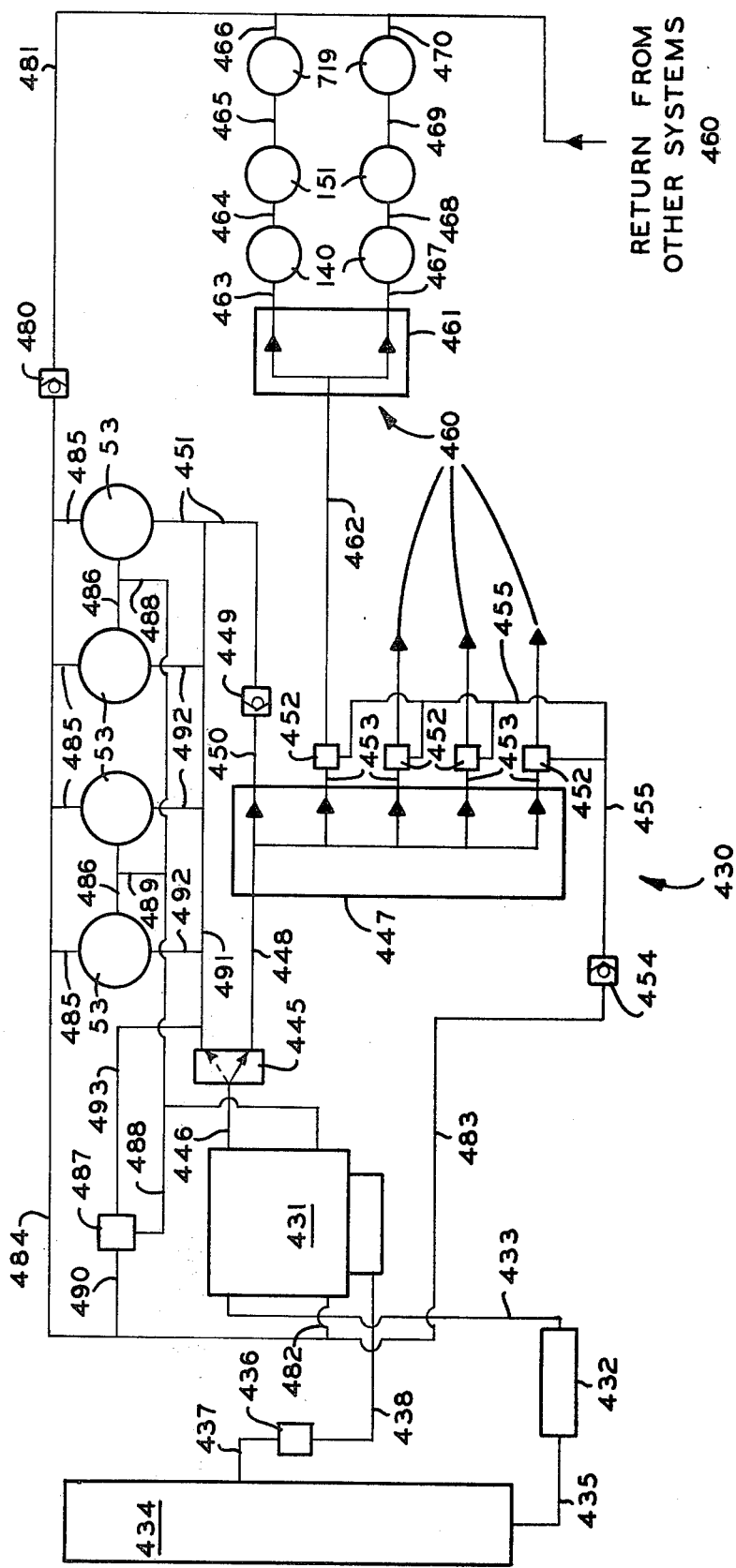
FIG. 25 is a fragmentary schematic diagram of the ground speed and related function control system of the present invention.

A ground speed and related function control system 430 for the apparatus 10 is shown in the schematic diagram of FIG. 25. The control system 430 has a hydrostatic pump 431 and a heat exchanger 432. A hydraulic conduit 433 interconnects the hydrostatic pump and the heat exchanger in fluid supplying relation to the heat exchanger. A return conduit filter 434 is connected to the heat exchanger in downstream relation by a hydraulic conduit 435. The control system has a suction filter 436. A hydraulic conduit 437 interconnects the filter 434 and the filter 436. A hydraulic conduit 438 interconnects the suction filter and the hydrostatic pump 431 in fluid supplying relation.

The control system 430 has a selector valve 445. A hydraulic conduit 446 interconnects the hydrostatic pump 431 and the selector valve 445. The control system 430 has a flow divider 447. A hydraulic conduit 448 interconnects one side of the selector valve 445 and the flow divider 447 in fluid supplying relation. The control system has a check valve 449 which is linked to the flow divider through a hydraulic conduit 450. A hydraulic conduit 451 interconnects the check valve 449 and the hydraulic motor 53 on the far right, as viewed schematically in FIG. 25. The control system has a plurality of pressure relief valves 452. Hydraulic conduits 453 individually interconnect the flow divider 447 and the four relief valves 452 in fluid supplying relation. The control system 430 has a check valve 454. Hydraulic conduit system 455 individually interconnects each of the pressure relief valves and the check valve 454 in fluid supplying relation, as shown in FIG. 25. It will be seen that operation of the relief valves 452 to release fluid pressure from the system upon the reaching of a predetermined maximum fluid pressure causes the fluid to be diverted through the hydraulic conduit system 455 to the check valve 454. As will hereinafter be more fully described, such a release of pressure causes the balance in the entire system to be re-established so as to maintain a substantially common fluid pressure throughout the system 430.

The ground speed in related function control system 430 has an auger drive system 460 for each of the harvesting units 75 of the apparatus 10, or, in other words, in the preferred embodiment there are four such auger drive systems. As heretofore described in relation to the other systems 230 and 330 respectively, only one of the auger drive systems 460 is described for purposes of simplicity and illustrative convenience. It will be understood that the other three auger drive systems are substantially identical in structure and operation to that to be described and that the auger drive systems are connected to the system in parallel each being individually connected to one of the relief valves 452.

Each auger drive system 460 has a flow divider 461. A hydraulic conduit 462 interconnects the relief valve 452 of that auger drive system and the flow divider thereof in fluid supplying relation. An hydraulic conduit 463 interconnects the flow divider 461 and the hydraulic drive motors 140 of one of the auger assemblies 135 of its respective harvesting unit 75. An hydraulic conduit 464 interconnects the hydraulic motor 140 connected to conduit 463 and the hydraulic drive motor 151 of horizontal drive assembly 145 on the same side of the harvesting unit. Hydraulic conduits 465 and 466 are connected in series relation to the latter hydraulic motor 151 connected to hydraulic conduit 464. The two conduits 465 and 466 are described herein rather than a single conduit for ease of describing the addition of an element to the system which is employed in the second form of the invention hereinafter to be described.

On the opposite side of the harvesting unit 75 to which the representative auger drive system 460 is connected, an hydraulic conduit 467 interconnects the flow divider 461 and the hydraulic drive motor 140 of the auger assembly 135 on that side of the harvesting unit. An hydraulic conduit 468 interconnects the hydraulic drive motor 140 and the hydraulic drive motor 151 on the same side of the harvesting unit. Hydraulic conduits 469 and 470 are connected in series relation to the latter hydraulic drive motor 151 on that side of the harvesting unit. As previously described two such conduits are identified rather than one for purposes of illustrative convenience in identifying an element employed in the second form of the invention hereinafter to be described.

The ground speed and related function control system 430 has a check valve 480. An hydraulic conduit 481 interconnects the conduits 466 and 470 of each of the auger drive systems 460 and the check valve 480, as shown in FIG. 25. An hydraulic conduit 482 extends from the hydrostatic pump 431, as shown in FIG. 25. An hydraulic conduit 483 interconnects conduit 482 and check valve 454. A hydraulic conduit 484 interconnects conduits 482 ad 483 and check valve 480. Four hydraulic conduits 485 individually interconnect conduit 484 and each of the hydraulic motors 53 in fluid supplying relation. Hydraulic conduits 486 individually interconnect a pair of the hydraulic motors 53.

The ground speed and related function control system 430 has a manifold valve assembly 487. A hydraulic conduit 488 interconnects conduit 486 on the right, as viewed in FIG. 25, and the manifold valve assembly 487. An hydraulic conduit 489 interconnects the other conduit 486 and the conduit 488. Hydraulic conduit 490 interconnects the manifold valve assembly 487 and conduit 484. Hydraulic conduit 491 is connected to the side of the selector valve 445 opposite to that to which hydraulic conduit 448 is connected. Hydraulic conduit 491, at its opposite end, is connected to hydraulic conduit 451. Hydraulic conduits 492 individually interconnect conduit 491 and the three drive motors 53 not otherwise connected to conduit 451, as shown in FIG. 25. Hydraulic conduit 493 interconnects the manifold valve assembly 487 and hydraulic conduit 491.

It will be seen that the purpose of the ground speed in related function control system 430 is to maintain movement of the auger assemblies 135 and horizontal drive assemblies 145 on each side of each harvesting unit 75 at a rearward speed corresponding to or relating to the forward ground speed of the apparatus 10 during operation.

The various above described controls for the control systems 230, 330 and 430, including the steering wheel 333 are contained in a control center 495 for the apparatus mounted on the platform 48. A seat 496 is mounted on the platform in the control center for the use of an operator.

SECOND EMBODIMENT

The second embodiment of the apparatus of the present invention is identified at 510 and shown in FIGS. 15 through 25. Apparatus 510 is virtually identical in most respects to the form of the apparatus 10 previously described. Apparatus 510 varies from apparatus 10 primarily in that it has a mechanism adapted automatically to harvest the grapes from the vines during passage through each of the harvesting units and thus does not require field workers for the performance of the harvesting operation.

Figures 16, 17:
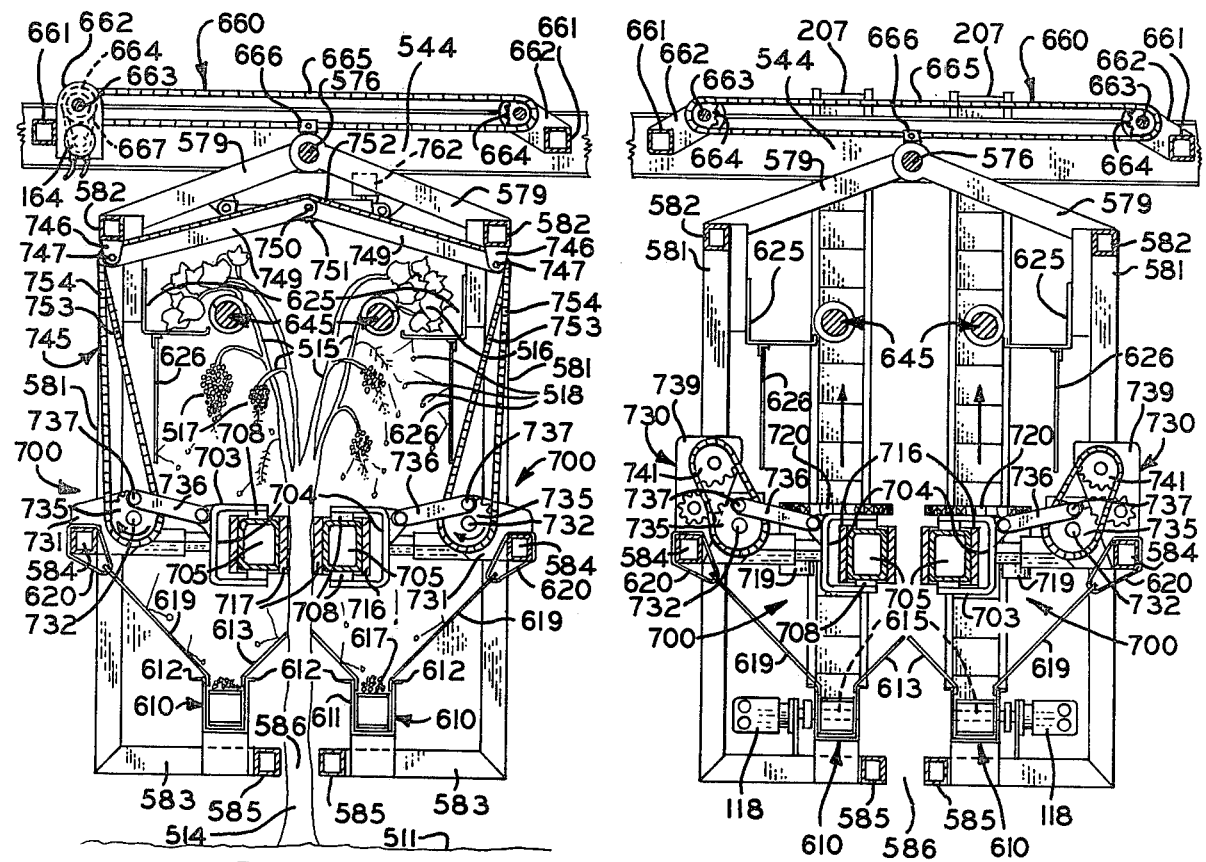
FIG. 16 is a fragmentary transverse vertical section taken on line 16—16 in FIG. 15.
FIG. 17 is a fragmentary transverse vertical section taken on line 17—17 in FIG. 15.

In view of this close similarity and for illustrative convenience and ease of understanding, only a representative one of the harvesting units of the apparatus 510 is described herein. For the same reasons, only those changes and additions in the apparatus 510 and the systems 230, 330 and 430 which are different from apparatus 10 are described. It will be understood that in all other respects the apparatus 510 is identical to apparatus 10 previously described. As shown in FIG. 16, the earth's surface is represented at 511, in which a grapevine 514 is growing. The grapevine has elongated vine structures, elements or canes 515, foliage 516 and the grape bunches 517. Individual grapes are indicated at 518.

The apparatus 510 has a main frame 525 a portion of which is visible in FIG. 15. That portion of the main frame visible in FIG. 15 includes a supporting member or I beam 544 having a track or guideway 546 therein. As previously described, it is understood that the portions of the apparatus 510, including the main frame 525, the supporting member 544 and the track 546 are identical to the corresponding elements 25, 44 and 46 of apparatus 10.

The apparatus has four harvesting units 575. It will be understood that, as in the apparatus 10, the four harvesting units are individually supported on the tracks or guideways 546 of the main frame 525. Each harvesting unit has a support shaft 576 mounting support wheels 577 on the opposite ends thereof which are received in the tracks or guideways 546 of the main frame 535. One of the harvesting units is shown and described herein.

Each harvesting unit 575 has a subframe 578. The subframe has two pairs of opposed tubular beams 579. The pairs of beams are individually disposed adjacent to the forward and rearward ends of the subframe with respect to the normal operational direction of travel of the harvesting unit. As can best be seen in FIGS. 15, 16 and 17, the beams of each pair are aligned with each other transversely of the subframe and individually mount bearings 580 through which the support shaft 576 is extended, as shown in FIG. 15. Thus, it will be seen that the beams of each pair 579 are rotationally mounted on the shaft 576 and are pivotal with respect to each other. Each subframe has four corner posts 581. Each corner post is individually secured, as by welding, on the end of one of the beams of each pair of beams 579 opposite to its respective bearing 580. As will hereinafter be described, in their normal orientation, the corner posts 581 are extended downwardly in substantially vertical, parallel attitudes. A pair of upper longitudinal frame members 582 interconnect corresponding outer ends of the tubular beams 579 so as to extend in substantially parallel relation longitudinally of the subframe. Four transverse frame members 583 are individually mounted on the lower ends of the corner posts 581, and disposed in substantially right-angular relation thereto. A pair of outer longitudinal frame members 584 are fastened on the corner posts 581 on corresponding sides of the subframe and extend in substantially parallel relation therebetween aligned longitudinally of the apparatus. A pair of inner longitudinal frame members 585 are affixed on the transverse frame members 583. The frame members 585 define a longitudinal pathway or passage 586 therebetween extending longitudinally of the subframe.

Each harvesting unit has a pair of forward frames 595. Each of the forward frames has a forward beam 596 secured on the forward transverse frame member 583. The forward beams 596 of each subframe extend in diverging relation forwardly of the harvesting unit on opposite sides of the pathway 586. A mounting plate 597 is borne by each forward beam at the forwardmost end thereof extending upwardly and forwardly therefrom at a predetermined angle. A bearing 598 is mounted on each mounting plate defining an axis of rotation which is inclined toward the rear of the apparatus 510. The axes of rotation defined by the bearings of each harvesting unit 75 are convergent upon each other to a slight degree, as can best be seen in FIGS. 19 and 21.

Each harvesting unit 575 has a pair of substantially parallel conveyor assemblies 610 mounted on the transverse frame members 583 and individually adjacent to the longitudinal frame members 585, as best shown in FIGS. 16 and 17. The conveyor assemblies are similar to the conveyor assemblies 110 of the apparatus 10 in both structure and operation with the exception that the conveyor assemblies 610 are somewhat narrower than conveyor assemblies 110. Each conveyor assembly has an elongated frame or trough 611 with upper edges 612. Each trough has a flexible panel 613 secured on the upper edge thereof nearest the passage 586 of the harvesting unit. The panels of the troughs of each harvesting unit are upwardly convergent, as shown in FIGS. 16 and 17, and extend throughout the lengths of the troughs.

An idler roller assembly 614 mounted on the trough 611 for rotational movement extending transversely thereof adjacent to the forward frame 595 of the harvesting unit 575. A drive roller assembly 615 is mounted for rotational movement on the trough extending transversely thereof at the opposite end of the harvesting unit. A conveyor belt 616, having an upper run 617, is extended about the roller assemblies 614 and 615 for movement of the upper run of the conveyor belt toward the left, as viewed in FIG. 18. A pair of hydraulic drive motors are individually secured on the troughs of each harvesting unit in driving engagement with the drive roller assemblies 615 of the conveyor assembly 610 for driving the conveyor belts. For purposes of illustrative convenience and ease of understanding, these hydraulic drive motors are identified in FIGS. 17 and 23 by the same numeral, 118 as employed to identify the corresponding motors of the apparatus 10 of the first form of the invention. A fabric panel 619 is fastened on the upper edge 612 opposite that mounting the flexible panel 613 of each trough extending along the entire edge thereof and secured along its opposite edge to frame member 584 by a plurality of ties 620, as shown in FIGS. 15 through 18.

Insofar as much of the equipment of the harvesting units 575 is identical to that described in regard to the first form of the invention for harvesting units 75, general reference will be sufficient to identify their structure and positioning on the harvesting units 575. Thus, the harvesting unit 575 has a pair of auger or guide chutes 625 mounted on the subframe 578 which are substantially identical to the guide chutes 125 of harvesting units 75. A fabric panel 626 if fastened on the underside of each guide chute and is gravitationally suspended therebelow. A guide bar 633 is mounted on and extends between the forward end of each forward beam 596 and its respective guide chute, as best shown in FIGS. 15 through 21. The harvesting unit 575 has a pair of auger assemblies 635 mounted therein which are substantially identical to the auger assemblies 135 of harvesting units 75. Harvesting unit 575 has a pair of horizontal drive assemblies 645 which are identical to the corresponding horizontal drive assemblies 145 of the harvesting units 75.

Each harvesting unit 575 has an alignment assembly 660 which is similar in structure and operation to the alignment assembly 160 of harvesting units 75, but not identical. The alignment assembly, shown in FIGS. 15 through 17, has a pair of longitudinal members 661 which are mounted on and extend in spaced parallel relation between the I beams 544 of the main frame 525. The members 661 are disposed laterally of and above their respective harvesting unit, as can be seen in FIGS. 16 and 17. A pair of mounting plates 662 are affixed on each member 661 individually adjacent to the opposite ends thereof. A shaft 663 is rotationally mounted on and extends between the mounting plates of each member. A pair of sprockets 664 are fastened on each shaft 663 adjacent to the opposite ends thereof. The corresponding sprockets of the shafts of each pair are linked in driving relation by chains 665. The chain nearest to the forward frame 595 of each harvesting unit is connected to the pair of opposed tubular beams 579 thereof by a link 666. A hydraulic motor is secured on the mounting plate 662 on the left as viewed in FIG. 16.

For purposes of illustrative convenience and ease of understanding, this hydraulic motor is identified in FIGS. 15, 16 and 24 by the same numeral 164 as employed to identify the corresponding motor of the apparatus 10 of the first form of the invention. The hydraulic motor is connected to driving relation to the adjacent shaft 663 by a drive linkage 667. The alignment assembly 660 preferably also has a manual hydraulic control valve which, for ease of understanding, is generally identified herein by the same numeral 172 as used in the case of the identical corresponding structure of the apparatus 10. It will be understood that the valve 172 is connected to hydraulic motor 164 of apparatus 510 just as described with respect to apparatus 10 and shown in FIGS. 9, 10 and 24. Thus, it will be seen that operation of the hydraulic motor 164 operates to reposition the harvesting unit 575 adjacent thereto on the I beams 544 through the interconnection of the sprockets 664, chain 665, link 666, beams 579 and support shaft 576.

Each of the harvesting units 575 has an attitude sensor 680 mounted on one of the corner posts 581. The attitude sensor 680 is identical to the attitude sensor 180 of harvesting unit 75.

Figure 18:
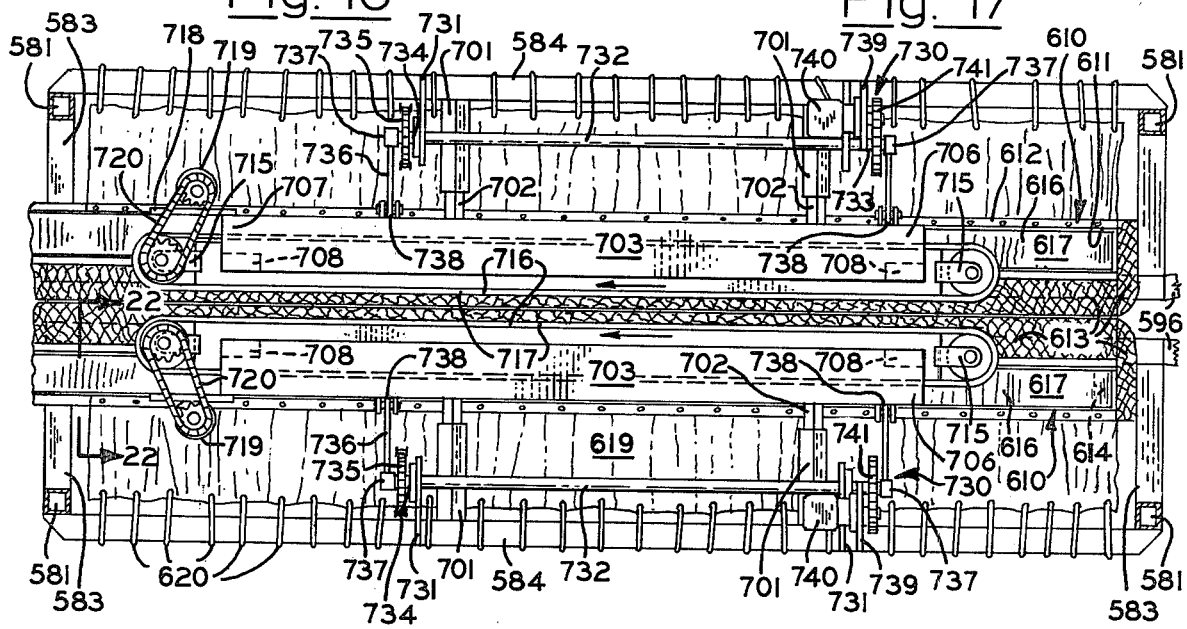
FIG. 18 is a fragmentary horizontal section taken on line 18—18 in FIG. 15.

Each of the harvesting units 575 has a pair of grasping or shaking mechanisms or assemblies 700 mounted therein in opposed relation, as best shown in FIGS. 16 through 18, for engaging the grapevines and imparting reciprocating motion thereto. The shaking assemblies are the key to the operation of the apparatus 510 and constitute the primary difference from the apparatus 10. Each assembly 700 has a pair of tubular guides 701 secured on its adjacent frame member 584 and extended in spaced parallel relation toward the center of the harvesting unit and normal to the frame member 584. A mount 702 is telescopically, slidably received in each guide 701. A channel member 703, having an internal channel 704, is borne by the mounts 702 of each pair of tubular guides. The channel members of each pair of shaking assemblies 700 are disposed, as best shown in FIGS. 16 and 17, in predetermined spaced, parallel relation.

A shaking member tubular beam 705, having a forward end 706 and a rearward end 707, is mounted on a plurality of blocks 708 within the channel 704 of each channel member 703. Each beam 705 is mounted on its respective blocks 708 to provide space between the beam and the channel member evident in FIGS. 16 and 17.

Figure 22:
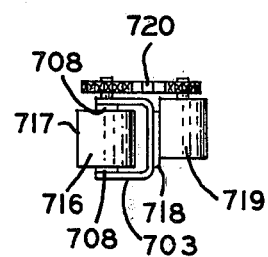
FIG. 22 is a fragmentary transverse vertical section taken on line 22—22 in FIG. 18.

A belt pulley assembly 715 is mounted on the forward and rearward ends 706 and 707 of each beam 705. A resilient or cushioned belt 716 is operably extended about the pulley assemblies 715 and beam 705 of each shaking assembly 700. Each belt has an inner run 717 which is adapted, as will hereinafter be described, to be carried along the surface of the beam 705 above the passage 586 of the harvesting unit 575. A motor mount 718 is borne by the channel member 703 of each shaking assembly adjacent to the rearward end 707 of its respective tubular beam 705, as best shown in FIGS. 18 and 22. A hydraulic drive motor 719 is secured on each motor mount. A chain and sprocket linkage 720 operatively interconnects each hydraulic drive motor 719 and its respective belt pulley assembly 715 at the rearward end 706 of the tubular beam 705. The hydraulic drive motors 719 are operable to drive the inner runs 717 of their belts 716 at substantially ground speed in a direction to the left, as viewed in FIG. 18.

Each shaking assembly 700 of each harvesting unit 575 has an eccentric assembly 730. Each eccentric assembly has a pair of shaft mounting plates 731 mounted in spaced relation on one of the frame members 584 extending in parallel relation into the interior of the harvesting unit 575. A shaft 732 is rotationally received in the mounting plates 731 for rotation about its longitudinal axis disposed parallel to its respective adjacent channel member 703. The shaft has a forward end 733 and a rearward end 734. Sprockets 735 are individually mounted on the forward and rearward ends of the shaft. A drive arm 736 interconnects each sprocket 735 and the channel member 703. Each drive arm is pivotally mounted on its respective sprocket eccentric to the axis of rotation of the sprocket and shaft 732 by a pivot mount 737. The opposite end of each drive arm is pivotally mounted on the channel member 703 by a pivot mount 738. The drive arms 736, sprockets 735 and shafts 732 of each harvesting unit 575 are arranged, as best shown in FIGS. 16 and 17, so that rotation of the shafts 732 in the same directions of rotation and same speeds of rotation causes the beams 705 and the inner runs 717 of the belts 716 borne thereby to be reciprocated in a shaking through positions of substantial parallelism action transversely of the harvesting unit. It will also be seen that the spacing between the inner runs of the belts of the opposed shaking assemblies 700 are maintained in the same preselected constant spaced relation during this reciprocal shaking action.

A motor mounting plate 739 is affixed on each frame member 584 adjacent to the shaft mounting plates 731 nearest the forward ends 733 of the shafts 732, as can best be seen in FIG. 18. A hydraulic drive motor 740 is borne by each mounting plate 739. A sprocket and chain linkage 741 interconnects each hydraulic drive motor 740 and the adjacent sprocket 735 at the forward end of its respective shaft 732. Operation of the hydraulic drive motors 740 of each harvesting unit 575 operates the shaking assemblies in the manner described above.

The shaking assemblies 700 of each harvesting unit 575 are interconnected by a synchronizing assembly 745. The synchronizing assembly has a mounting bracket 746 fastened on the underside of each frame member 582 above the rearwardmost sprockets 735 of the shafts 732. A shaft 747 is mounted on each mounting bracket 746. A pair of idler sprockets 748 are rotationally mounted on each shaft 747. A pair of arms 749 are individually, pivotally mounted on the mounting brackets 746 of each harvesting unit 575. The arms 749 are pivotally interconnected at their inwardly extending ends by a center shaft 750. A pair of idler sprockets 751 are mounted for rotational movement of the center shaft. A synchronizing chain 752 is extended about the rearward sprocket 735 on the left, as viewed in FIG. 16; over the pair of idler sprockets 748 of the mounting bracket 746 on the left in FIG. 16; over the idler sprockets 751; over the idler sprockets 748 of the mounting bracket 746 on the right, as viewed in FIG. 16; and is extended about the rearward sprocket 735 on the right, as viewed in FIG. 16. The synchronizing chain, so connected, extending upwardly from each rearward sprocket 735 forms an inner, rearward run 753, which is extended over the rearwardmost sprocket of the pair of sprockets 748, and an outer, forward run 754, which is extended over the forwardmost sprocket of the pair of sprockets 748. The synchronizing chain thus operates mechanically to insure that the shaking assemblies are operated in a reciprocating or shaking action described while maintaining the constant preselected distance between the inner runs 717 of the belts 716.

Figure 19:
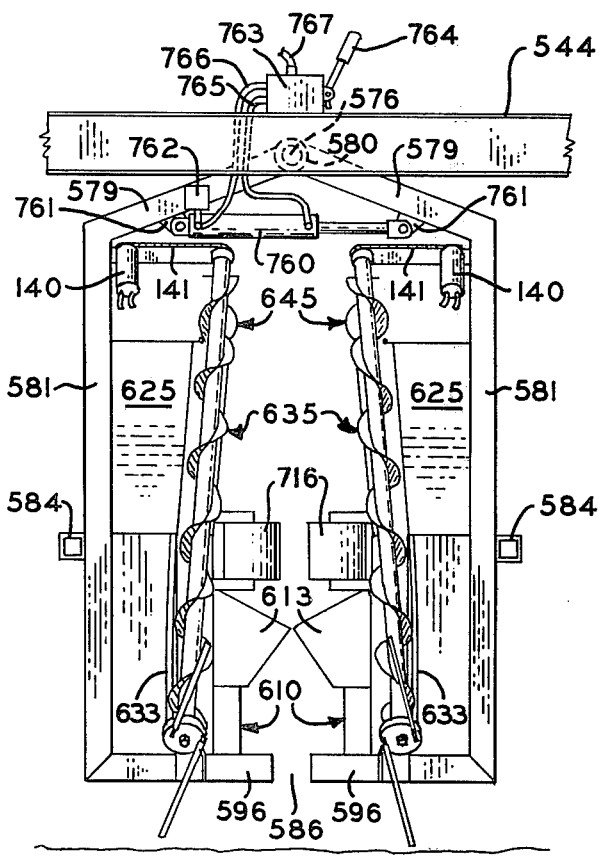
FIG. 19 is a fragmentary front elevation of the harvesting unit of FIG. 15.
Figure 20:
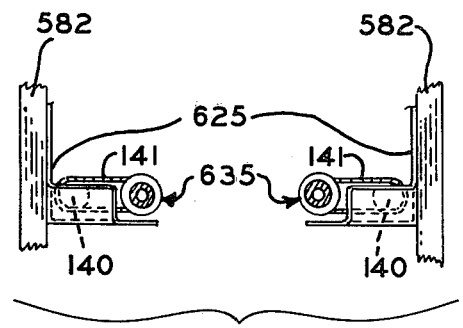
FIG. 20 is a transverse section taken on line 20—20 in FIG. 15.
Figure 21:
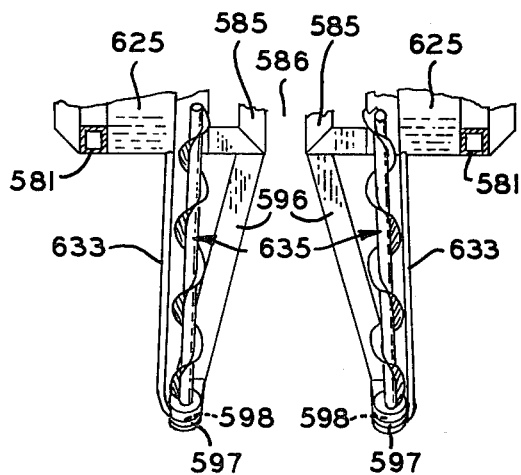
FIG. 21 is a fragmentary horizontal section taken on line 21—21 in FIG. 15.

A hydraulic cylinder 760 is mounted on each of the harvesting units 575. Each hydraulic cylinder 760 is pivotally mounted, at its opposite ends on the tubular beams 579, as best shown in FIG. 19. A manually operable gas canister containing a compressible gas, such as nitrogen, is mounted on the hydraulic cylinder 760 and communicates with the interior of the pressure side thereof, as shown in FIG. 19. The canister is operable to inject or release the compressible gas into or from the pressure side of the hydraulic cylinder. The gas within the pressure side of the hydraulic cylinder operates as an adjustable cushion to prevent the closure of the passage 586 and the space between the shaking assemblies beyond a minimum selected by the creation of the gas pressure within the cylinder 760. A manual control valve 763, having a control lever 764, is mounted on the I beam 44 above each harvesting unit on the side of the I beam opposite to the guide way 46. Hydraulic conduits 765 and 766 operatively interconnect the control valve 763 and the cylinder. As shown in FIGS. 19 and 24, a hydraulic conduit 767 interconnects hydraulic conduit 400 and the control valve 763 in fluid supplying relation. A hydraulic conduit 768 interconnects control valve 763 and hydraulic conduit 389 in return relation.

Thus, it will be seen that operation of the control valve 763 using lever 764 operates, in effect, individually to expand or reduce the distance between the inner runs 717 of the belts 716 of each harvesting unit for optimum spacing for the size and state of development of the grapevines or other work objects to be worked upon. As previously noted, the canister 762 is then employed to create sufficient pressure within the cylinder 760 to prevent inadvertent further reduction of the selected spacing.

The main hydraulic system for the second embodiment of the present invention is virtually identical to that for the first embodiment of the invention previously described and identified by numeral 230 in FIG. 23. The only major distinction involved is the addition of a shaker drive system 770 shown in FIG. 23. The shaker drive system has a flow control valve 771. An hydraulic conduit 772 interconnects the gear flow divider 266 and the flow control valve 771 in fluid supplying relation. The hydraulic motors 740 are included as part of the shaker drive system 770. An hydraulic conduit 773 is connected to and extends from the flow control valve 771. A pair of hydraulic conduits 774 and 775 respectively are individually connected to the hydraulic conduit 773 and are branched therefrom and individually connected at their respective opposite ends to the hydraulic motors 740, as shown in FIG. 23. A hydraulic conduit 776 interconnects the hydraulic motor 740 connected to hydraulic conduit 774 and is connected at its opposite end to hydraulic conduit 272 of the main hydraulic system 230. A hydraulic conduit 777 is connected to the other hydraulic motor 740 at one end thereof and to hydraulic conduit 272 at the other end thereof. Thus, the hydraulic motors 740 are connected in parallel to the shaker drive system 770 in fluid supplying relation to hydraulic conduit 272 and are operated as part of the main hydraulic system 230.

In addition to the hydraulic system for the hydraulic cylinders 760 and the shaker drive system 770, both of which have already been described, the only other modification to any of the hydraulic systems 230, 330 and 430 in the second embodiment of the present invention is in the ground speed and related function control system 430, shown in FIG. 25. As can be seen, hydraulic drive motors 719 which power the belts 716 of the shaking assemblies 700 are mounted in parallel in the auger drive system 460. Hydraulic motor 719 is mounted so as to interconnect hydraulic conduits 465 and 466. Similarly, the other hydraulic drive motor 719 is mounted so as to interconnect hydraulic conduits 469 and 470. Thus, it will be seen that operation of the auger drive system 460 operates not only the hydraulic drive motors 140 of the auger assembly 135 and hydraulic drive motors 151 of the horizontal drive assembly 145, but also the hydraulic drive motors 719 of the belts 716 so as to maintain the speed of the auger assemblies 135, horizontal drive assembly 145 and belts 716 at substantially ground speed.

OPERATION

The operation of the described embodiments of the subject invention are believed to be clearly apparent and are briefly summarized at this point. The operation of both embodiments of the invention are substantially identical except that apparatus 10 provides for the manual harvesting of grapes in the harvesting units 75 while apparatus 510 mounts the shaking assemblies 700 in the harvesting units 575 for the fully automatic harvesting of the grapes. Accordingly, the operation of the apparatus 10 and 510 will be described simultaneously with the exception of the dissimilar operations.

The apparatuses 10 and 510 are operated using the various controls of the control center 495. Where it is necessary to transport the apparatuses 10 and 510 in confined areas such as along roadways during movement to the particular location for the harvesting operation, the apparatuses are modified to achieve the arrangement shown in FIG. 11. In this arrangement the wheel assemblies 43 are oriented to track along paths substantially parallel to the I beams 44 rather than at the normal right-angular attitudes shown in FIGS. 1 through 3. This provides the apparatuses, with more narrow effective widths for the purpose of such transport. Modification of the apparatuses to the arrangement of FIG. 11 is accomplished by elevating the apparatuses, using suitable jacks not shown, disconnecting the linkages 62 and cylinders 63 and 64 from the lever arms 61 and rotating the wheel assemblies 43 to the positions shown in FIG. 11. The lever arm 61 of the front corner post 26 on the right, as viewed in FIG. 2, is then removed and replaced with the auxiliary lever arm 69 and the adjacent hydraulic cylinder 63 is connected to lever arm 69. Subsequently, the boom 70 of the auxiliary steering assembly 68 on the right in FIG. 11 is mounted on the lever arms 61 and 69 to permit steering through the use of the hydraulic cylinder 63. The boom 70 of the other steering assembly is secured in interconnecting relation on the lever arms 61 on the left as viewed in FIG. 11 simply to maintain the parallel relationship shown in that view.

When the apparatuses 10 and 510 reach the area in which harvesting is to be performed, they are oriented with respect to the rows of grapevines 12, as shown in FIGS. 1 and 2. If the auxiliary steering assemblies 68 have been employed, the steering assemblies 68 are disconnected and the steering assemblies 58, and hydraulic cylinders 63 and 64 are reconnected, as shown in FIGS. 1 and 2 and previously described. Using the lever arm assembly 173 of the control valve 172 of each harvesting unit 75, each harvesting unit is then positioned in precise alignment with its respective row of grapevines 12. Thus, by moving the lever arm 173, the hydraulic control valve 172 is operated to in turn operate hydraulic motor 164 to move its respective harvesting unit transversely on the I beams 44 to alignment with its respective row. Such alignment requires the row to be longitudinally aligned with the passage 86 of apparatus 10 and 586 of apparatus 510, as shown in the drawings.

Subsequently the ground speed and related function control system 430 is operated by starting the engine 55 to operate the hydrostatic pump 431. The system 430 is operated in a forward direction to direct fluid along conduits 484 and 485 to the wheel assembly drive motors 53 thereby operating the wheel assemblies 43 to carry the apparatuses 10 and 510 along the rows of vines 12. Similarly, the selector valve 445 is operated to direct hydraulic fluid along hydraulic conduit 448 through the flow divider 447 for operation of the auger assembly hydraulic drive motors 140, horizontal drive assembly drive motors 151 and, in apparatus 510, hydraulic drive motors 719 which drive the cushioned belts 716. As previously described, such operation maintains rotational movement of the auger assemblies 135 and horizontal drive assemblies 145 at substantially ground speed relative to the effective rearward movement thereof. Similarly, in apparatus 510 the inner runs 717 of belts 716 are moved rearwardly in their respective harvesting units 575 at substantially ground speed on opposite sides of the passage 586.

Simultaneously, the main hydraulic system 230, shown in FIG. 23 is operated to drive, by the supply of hydraulic fluid thereto, the hydraulic drive motors 118 of the conveyor assemblies 110, the hydraulic drive motors 198 of the conveyor assembly 191, the hydraulic drive motors 202 of the discharge conveyor assembly 200, the hydraulic motor 206 of the blower fan 205, and, in apparatus 510 the hydraulic drive motors 740 of the shaking assemblies 700. As can be seen in FIGS. 3, 4, 7, 8 and 16, the lifting conveyor assemblies 207 of apparatuses 10 and 510 are driven mechanically by drive linkages 212 from hydraulic drive motors 118 and drive roller assemblies 115.

With respect to apparatus 510, each harvesting unit 575 can be individually adjusted to define a passage 586 of optimum width. This is accomplished, as previously described, by use of the control valve 763. As can be seen best in FIG. 19, the control valve 763 is operated to expand or contract the hydraulic cylinder 760 correspondingly to expand or contract the width of the passage 586 and the distance between the inner runs 717 of the belts 716 of the shaking assemblies 700. Thus, the opposed tubular beams 579 are pivoted by the hydraulic cylinder 760 on their support shaft 576 toward or from each other to, in effect, draw the opposite halves of the harvesting unit 575 toward or motivate them from each other. The optimum spacing of the inner runs 717 is such that the runs gently engage the grapevines. The canister 762 is also operated, as previously described, to create a gas cushion within the cylinder 760 preventing further convergence of the inner runs 717 once the optimum spacing is achieved.

During movement of the apparatuses 10 and 510 along the rows of grapevines, the tangential fingers 143 of each auger assembly 135 come upwardly under the vine structures or canes 15 and 515 of each grapevine 14 and 514 to assist in carrying them over and about the auger blades 139 of each auger assembly 135. The auger assemblies themselves usually operate satisfactorily to pick up the canes, but the fingers are of assistance particularly in certain varieties of grapevines. Since, as previously noted, the auger assemblies rotate in opposite complimentary directions to carry the canes outwardly from and on opposite sides of each grapevine, as can perhaps best be visualized in FIG. 1; and since, as also previously described, the longitudinal movement imparted by the auger assemblies is substantially the same as the ground speed of the apparatuses, the effect of passage of the apparatuses along the rows of grapevines is simply to raise the canes to elevated positions such as shown in FIG. 5 with respect to apparatus 10 in FIG. 6 with respect to apparatus 510. The guide bars 133 and 633 assist in preventing the canes and foliage from becoming entangled in the auger assemblies as can be visualized in FIG. 6. The guide chutes 125 and 625 operate to isolate the foliage 16 and 516 and canes 15 and 515 of the grapevines from the grape bunches 17 and 517 borne by the grapevines. This isolation assists in preventing foliage, canes and the like from being intermixed with the harvested grapes. In the case of apparatus 10, the field workers 107 seated on the seats 106 are free to cut the grape bunches from the grapevines during their passage in relative movement through the work station 108 of the harvesting unit. The grapes so harvested are permitted simply to fall gravitationally onto the upper runs 117 of the conveyor assemblies 110. The grapes received on the upper runs of the conveyor assemblies are transported thereby rearwardly through the harvesting unit and are rearwardly discharged onto the elevator or lifting conveyor assemblies 207. The panels or buckets 214 mounted on the lifting conveyor belts 213 carry the harvested grape bunches upwardly to the upper ends 210 of the conveyor assemblies 207 from which they are discharged onto the conveyor assembly 191. The upper run 196 of the conveyor assembly 191 transports the harvested grape bunches therealong to the right, as viewed in FIG. 2. The grape bunches are discharged from conveyor assembly 191 onto the discharge conveyor assembly 200. As can be seen in FIG. 14, the grape bunches are discharged from the discharge conveyor assembly 200 into the gondola 220 in the adjacent path between the next two rows of grapevines.

The vacuum fan 205 mounted on conveyor assembly 200 spaced from the discharge end 197 of the conveyor assembly 191 operates vacuumatically to draw off dirt, foliage, vines and other trash as the grape bunches are transported along the discharge conveyor assembly 200. Thus, the grape bunches collected in the gondola are substantially free of all extraneous material. It will be seen that other vacuum fans can be mounted at selected positions on the apparatus to assist further in the separation of the extraneous material from the grape bunches.

During movement of the apparatuses 10 and 510 along the rows of grapevines 12 in the harvesting operation, the alignment assemblies 160 and 660 operate automatically to react to any misalignment of their respective harvesting units 75 or 575 with their respective rows of grapevines. As previously described, misalignment causes the harvesting unit to pivot about its support shaft 76 or 576 laterally of the row. As illustrated in FIG. 13, such pivoting causes the pendulum 181 of the attitude sensor gravitationally to be pivoted in the opposite direction relative to the harvesting unit to close the appropriate microswitch 183 or 184. Such closure of the microswitch operates the solenoid control valve 385 by power supply from the power source 390 to direct hydraulic fluid along the appropriate hydraulic conduit 387 or 388 to the hydraulic motor 164 of the alignment assembly. Thus, as can be seen in FIGS. 9 and 10, the hydraulic motor 164 is operated in the appropriate direction to rotate the support shaft 76 or 576 in a counteracting direction so as to overcome the initial misalignment of the harvesting unit with its respective row of grapevines. Since each harvesting unit possesses its own alignment assembly 160 or 660, the harvesting units automatically readjust themselves for precise alignment relative to the rows of grapevines 12 during movement of the apparatuses 10 and 510 through the field. Thus, the operator of the apparatus needs only to concern himself with substantial alignment of the apparatuses relative to the rows of grapevines. Similarly, the field workers borne on the harvesting units need devote their attention only to harvesting of the grape bunches passing in front of them through the work station 108.

It will be seen that the alignment assemblies 160 and 660 operate in the same manner even where the apparatuses 10 and 510 are operated along a sloped vineyard and the rows of grapevines are oriented in right-angular relation to the slope of the vineyard. Since the harvesting units 75 and 575 are pivotally suspended on the main frames 25 and 525 respectively as are the pendulums 181 within the attitude sensors 180, they are suspended in vertical attitudes even when the main frames are not horizontally disposed. Thus, any misalignment between a harvesting unit and its respective row of grapevines will operate the attitude sensor and achieve realignment of the unit in the manner described above.

Unlike apparatus 10, apparatus 510 does not have provision for field workers in the work station 108. Apparatus 510 mounts the shaking assemblies 700 in the work station 108. The auger assemblies 635 of apparatus 510 operate in a manner identical to the auger assemblies 135 of apparatus 10 to carry the canes 515 and foliage 516 of the grapevines 514 to raised attitudes, as shown in FIG. 16. Thus, the grape bunches 517 are exposed during passage through the work stations of the harvesting units 575. The grapevines are grasped and protected by the cushion belts 716 during passage along a first path of travel in relative movement through the work stations. The tubular beams, separated from the grapevines by the inner runs 717, press gently against opposite sides of the grapevine during passage between the shaking assemblies as the inner runs 717 are transported rearwardly of the machine at substantially ground speed. Thus, there is little or no relative movement between a grapevine and the inner runs of the belts during passage of the grapevine through the harvesting unit although the shaking assemblies operate to reciprocate or shake the grapevine in a second path of travel substantially transversely of the first path of travel.

The eccentric assemblies 730 are driven by the hydraulic drive motors 740 which rotate the shafts 732. The eccentric pivot mounts 737 operate in conjunction to reciprocate the tubular beams 705 and thus the inner runs 717 of the belts 716 transversely of the direction of travel of the grapevines through the harvesting unit. The synchronizing assembly 745 operates, as previously described, to insure that the reciprocal movement of the pair of inner runs 717 of each harvesting unit are maintained in the selected spacing during the reciprocal or shaking movement. Thus, damage to the grapevines as a result of the shaking action is substantially precluded.

The reciprocating action of the shaking assemblies 700 is adjusted by the operator to a frequency which is sufficient, for the particular variety and state of development for the grapevines involved, to cause the grape bunches 517 of the grapevines to be shaken to discharge the individual grapes 518 therefrom. As can best be visualized in FIG. 16, the grapes fall onto the upper runs 617 of the conveyor belts 616. The fabric panels 619 and 626 operate to absorb the force of grapes which are shaken off the bunches and are thrown laterally of the grapevines and to direct the grapes to the conveyor belts. The force absorbing characteristics of the panels are such that the grapes are protected from damage. The harvested grapes are then transported on the belts 616 to the lifting conveyor assemblies 207, upwardly to the conveyor assembly 191, transversely of the apparatus 510 to the discharge conveyor assembly 200 and thence into the gondola 220 as previously described with respect to apparatus 10.

When the simultaneous harvesting of four rows of grapes has been completed with the apparatuses 10 and 510, the steering wheel 333 is employed to steer the apparatuses from those harvested rows of grapevines and into alignment with a new set of four rows of grapevines without having to use the auxiliary steering assemblies 68.

It has been discovered with apparatus 510 that various unique results can be achieved by selective use of the rate of speed of reciprocation or shaking of the grapevines by the shaking assemblies 700. For example, with some varieties of grapevines a comparatively slower speed of reciprocation is all that is required for the removal of the grapes. Slowing of the speed of reciprocation to this minimum speed for these varieties assists further in protecting the grapevines. This is particularly useful where the grapevines are young and relatively delicate. Similarly, it has been discovered that where some grape bunches have begun to develop rot because, for example, of adverse weather conditions, a reduction of the rate of speed of reciprocation permits harvesting of only the usable grapes while leaving those which have begun to develop rot on the grapevines. Additionally, it has been discovered that if the cycle of reciprocation is of varied frequency, that is if the speed of reciprocation of an individual grapevine is varied during its period of engagement by the shaking assemblies, relatively more grapes are dislodged from the bunches of the grapevines.

Therefore, the apparatus of the present invention is operable in one embodiment to harvest grapes on a semi-automatic basis from a plurality of rows of grapevines simultaneously with little or no damage to the grapevines or harvested grapes and at a speed and with an economy of operation not heretofore achieved in any harvesting apparatus and in a second embodiment to harvest individual grapes on a virtually fully automatic basis with an economy of operation and an efficiency, ease and dependability not heretofore achieved in any prior art device.

Although the invention has been herein shown and described in what are conceived to be the most practical and preferred embodiments, it is recognized that departures may be made therefrom within the scope of the invention, which is not to be limited to the illustrative details disclosed.

Having described our invention, what we claim as new and desire to secure by Letters Patent is:

1. In a grape harvester powered for substantially continuous movement along a row of grapevines and having a work station through which the row passes in movement relative to the harvester during said continuous movement, a harvesting mechanism comprising a pair of members of rigid elongated construction; means mounting said members in the work station fixed in spaced, substantially parallel relation to each other for movement with the harvester individually on opposite sides of the row and for movement in said fixed relation to each other along a path substantially transversely of the row; means for reciprocating the members along said path to impart a grape dislodging motion to the grapevines of the row during said continuous movement of the harvester along the row; a pair of belts individually extended about the members having corresponding inner runs disposed for movement along the members; and means for moving said inner runs of the belts at substantially the speed of said continuous movement of the harvester along the row and in directions corresponding to the direction of said relative movement of the row to facilitate movement of the grapevines between said members.

2. An apparatus for harvesting grapes from grapevines grown in a row extending upwardly from the earth's surface and bearing the grapes at positions remote from the earth's surface, the apparatus comprising a frame having a work station and adapted for movement along the row to pass the row in substantially continuous relative movement through the work station; a pair of rigid elongated members having corresponding surfaces; means mounting said rigid members in the work station with said corresponding surfaces disposed in spaced, substantially parallel relation to each other to define a first path therebetween of sufficient width for passage of grapevines in the row between the rigid members in said substantially continuous relative movement and mounting the rigid members for movement in spaced, substantially parallel relation to each other along a substantially horizontal second path transversely of the row through positions of substantial parallelism to the row and nearer to the grapes on the grapevines than to the earth's surface; and means for reciprocating the rigid members along the second path through said positions of substantial parallelism to the row to shake the grapevines between said rigid members transversely of the row during said substantially continuous relative movement of the row between the rigid members to dislodge the grapes from the grapevines.

3. The apparatus of claim 2 wherein belts are individually borne by the rigid members having runs extending along said corresponding surfaces thereof and the apparatus has means for driving the belts to move said runs thereof along their respective corresponding surfaces of the rigid members in the direction of said relative movement of the row along the first path and substantially at the speed thereof to facilitate movement of the grapevines in the row between said rigid members.

4. The apparatus of claim 2 wherein said mounting means includes a subframe mounting said rigid members and the subframe is mounted on the frame of the apparatus for substantially pivotal movement about an axis substantially parallel to the first path defined by the rigid members and for movement along a path substantially right-angularly related to the first path and the apparatus mounts means for sensing said substantially pivotal movement of the subframe caused by misalignment of the subframe with a row in the first path and a control system interconnecting said sensing means and the mounting means operable to move the subframe along said substantially right-angularly related path upon the sensing means sensing said substantially pivotal movement to realign the subframe with said row.

* * * * *

UNITED STATES PATENT AND TRADEMARK OFFICE
CERTIFICATE OF CORRECTION

PATENT NO. : 4,172,352
DATED : October 30, 1979
INVENTOR(S) : McCarthy et al.

It is certified that error appears in the above-identified patent and that said Letters Patent are hereby corrected as shown below:

Column 4, line 49, delete "grapvines" and substitute ---grapevines---.

Column 8, line 18, delete "ae" and substitute ---are---.

Column 11, line 22, delete "21" and substitute ---212---.

Column 14, line 53, delete "113" and substitute ---183---.

Column 24, line 58, delete "Fig. 6" and substitute ---Fig. 16---.

Signed and Sealed this

Fifth Day of February 1980

[SEAL]

Attest:

SIDNEY A. DIAMOND

Attesting Officer      Commissioner of Patents and Trademarks